US011321889B1

(12) United States Patent
Sun et al.

(10) Patent No.: US 11,321,889 B1
(45) Date of Patent: May 3, 2022

(54) MULTI-LAYER LIGHTING SOURCE WITH TEXTURED LIGHTING GEL LAYER

(71) Applicant: Adobe Inc., San Jose, CA (US)

(72) Inventors: Xin Sun, Santa Clara, CA (US); Vineet Batra, Pitam Pura (IN); Sumit Dhingra, Krishna Nagar (IN); Nathan Aaron Carr, San Jose, CA (US); Ankit Phogat, Noida (IN)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 17/082,378

(22) Filed: Oct. 28, 2020

(51) Int. Cl.
| G06T 11/60 | (2006.01) |
| G06T 11/00 | (2006.01) |
| G06T 15/50 | (2011.01) |
| G06T 15/60 | (2006.01) |
| G06T 3/20 | (2006.01) |

(52) U.S. Cl.
CPC .............. G06T 11/60 (2013.01); G06T 3/20 (2013.01); G06T 11/001 (2013.01); G06T 15/506 (2013.01); G06T 15/60 (2013.01); G06T 2200/24 (2013.01)

(58) Field of Classification Search
CPC ........................................................ G06T 11/60
See application file for complete search history.

(56) References Cited

U.S. PATENT DOCUMENTS

| 10,755,474 B1* | 8/2020 | Schneider ............... G06T 15/08 |
| 2007/0018996 A1* | 1/2007 | Wang ..................... G06T 15/50 |
| | | 345/592 |

OTHER PUBLICATIONS

Walter, Bruce et al., "Microfacet Models for Refraction through Rough Surfaces", Proceedings of the 18th Eurographics Conference on Rendering Techniques, EGSR'07, Goslar, DEU, Eurographics Association [retrieved on Oct. 9, 2020]. Retrieved from the Internet <shorturl.at/hDEJ1>., Jun. 2007, 12 pages.

* cited by examiner

*Primary Examiner* — Shivang I Patel
(74) *Attorney, Agent, or Firm* — FIG. 1 Patents

(57) ABSTRACT

A multi-layer light source includes an emissive layer and a textured lighting gel layer, the lighting gel layer being situated between the emissive layer and a 2D canvas or a 3D object. User inputs controlling the multi-layer light source are received, these user inputs being provided with the user interacting with the 2D canvas without switching to editing in 3D space. The multi-layer light source is configured based on the user inputs and, based on the configuration, emission of light rays from the multi-layer light source is determined. Areas of shadows cast by 3D objects are also determined. An image generation system determines, a color of a location (e.g., a pixel) on the 2D canvas or the 3D object that a light ray intersects based on the color that is in the lighting gel layer that the light ray passes through.

20 Claims, 13 Drawing Sheets

MULTI-LAYER LIGHTING SOURCE WITH TEXTURED LIGHTING GEL LAYER

BACKGROUND

As computer technology has advanced, various types of applications have become increasingly complex. Examples of such applications include image editing applications that allow users to create new content, edit previously made content, and so forth. Many of these applications are in 2-dimensional (2D) space and provide various features allowing creation and editing of 2D images.

While these image editing applications are very useful, they are not without their problems. One such problem is that some users desire to incorporate 3-dimensional (3D) objects into 2D image editing applications. For example, some users desire to have 3D geometry generation such as bevel extensions, revolving of objects, and so forth available in their 2D image editing applications, expecting realistic 3D lighting and shading effects to be available as well. However, current solutions require the user to manually create all the geometric details to depict interactions with light such as shadows and highlights. This manual creation typically requires significant time and knowledge of 3D graphics design, which many users do not have. Accordingly, current solutions to incorporate 3D assets into 2D image editing applications are oftentimes time consuming and require knowledge that many users do not have, resulting in user dissatisfaction and frustration with their image editing applications.

SUMMARY

To mitigate the drawbacks of conventional image editing solutions, a multi-layer light source system as implemented by a computing device is described to provide a multi-layer lighting source with textured lighting gel layer. In one or more implementations, a 2D image having a texture is received. A user input indicating a positioning of the 2D image on a 2D canvas or on a 3D object on the 2D canvas is also received, the user input having two dimensions of control (e.g., the x dimension and y dimension in an x-y plane). The texture is mapped to a 2D lighting gel layer of the multi-layer light source, the 2D lighting gel layer being situated between an emissive layer of the multi-layer light source and the 2D canvas. The emission of the multi-layer light source is determined, based on the emissive layer and the 2D lighting gel layer, as the emission from the 2D lighting gel layer. Colors of locations on the 2D canvas or the 3D object are changed based on the emission of the multi-layer light source and the colors of locations of the 2D lighting gel layer that light rays pass through in illuminating the 2D canvas or the 3D object.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

DETAILED DESCRIPTION

Overview

Figure 1:
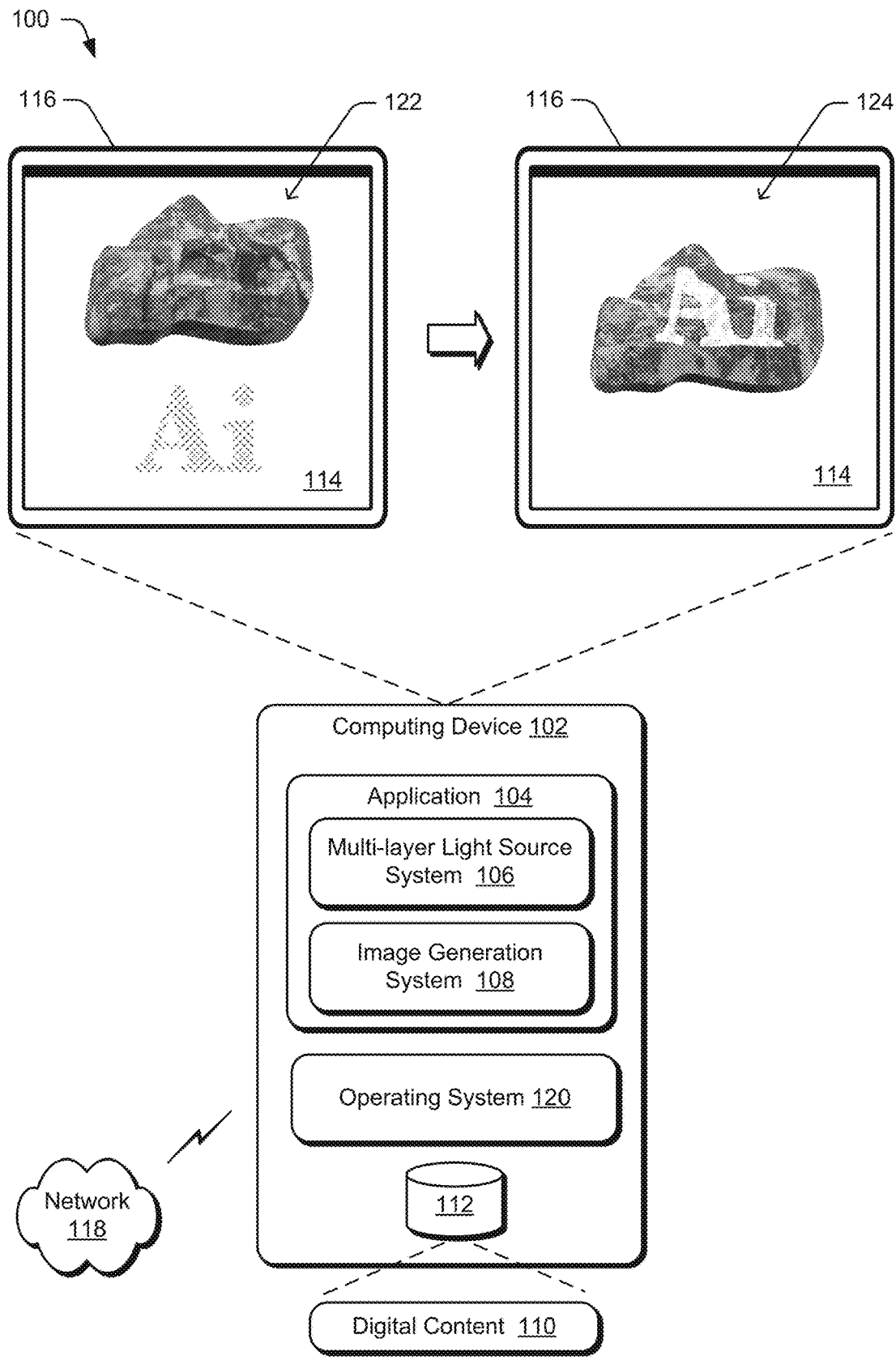
FIG. 1 is an illustration of a digital medium environment in an example implementation that is operable to employ the multi-layer lighting source with textured lighting gel layer described herein.

Current solutions for modeling 3D objects require the 3D object to be manually created and edited in 3D space in order to depict interactions with light such as shadows. Many users do not have sufficient knowledge of 3D graphics design to create and edit objects in 3D space, making it difficult for them to accurately model 3D objects.

To overcome these problems, a multi-layer lighting source having a textured lighting gel layer is discussed herein. Generally, a multi-layer light source includes an emissive layer and a textured lighting gel layer, the lighting gel layer being situated between the emissive layer and a 2D canvas or a 3D object. User inputs controlling the multi-layer light source are received, such as a texture to use for the lighting gel layer, the intensity of the emissive layer, the distance of the lighting gel layer from the 2D canvas or the 3D object, the position of the lighting gel layer with respect to the 2D canvas or the 3D object, and so forth. These user inputs are provided with the user interacting with the 2D canvas without switching to editing in 3D space. The multi-layer light source is configured based on the user inputs and, based on the configuration, emission of light rays from the multi-layer light source is determined. Areas of shadows cast by 3D objects are also determined. An image generation system determines a color of a location (e.g., a pixel) on the 2D canvas or the 3D object that one or more light rays intersect based on the one or more colors that are in the lighting gel layer that the one or more light rays pass through as well as the radiances of each of the one or more light rays determined by the locations of the lighting gel layer that the one or more light rays pass through.

More specifically, a multi-layer light source system receives user inputs to configure a multi-layer light source. In one or more implementations, the multi-layer light source is a dual-layer light source that provides varying light emission by placing a lighting gel layer in front of an emissive layer. The emissive layer is a diffuse emitter that shines a single color that is changed as it passes through the lighting gel layer. This is performed using, for example, ray-tracing or projective geometry. The lighting gel layer is mapped with a texture and is implementable in various 2D manners, such as pixel images, raster images, vector art, and so forth. The techniques discussed herein allow complex appearances to be produced intuitively without creating extra 3D geometries or light sources.

The multi-layer light source system receives one or more of various different user inputs, such as an indication of a position of the multi-layer light source (in 2D space), an indication of a distance between the lighting gel layer from a 3D object or a canvas on which a shadow is projected, an indication of the intensity of emitted light passing through the lighting gel layer, and an indication of a texture for the lighting gel layer. Various additional user inputs are also optionally received, such as whether the emissive layer is a local or distant light source, a distance between the emissive layer and the lighting gel layer, a position of the emissive layer (e.g., in order to cast shadows), and so forth. The multi-layer light source system configures the multi-layer light source in accordance with the received user inputs.

The emissive layer is implemented in various manners, for example as a single point or an area (e.g., an ellipse or other shape). The lighting gel layer is one of any of a variety of different shapes, such as a rectangle, ellipse, outline of text, and so forth. The lighting gel layer is generated based on any of a variety of different types of images or drawings, such as pixel images, raster images, vector art, and so forth. In one or more implementations an image or drawing is received and the texture in that image or drawing is mapped to the lighting gel layer.

Light rays passing through the lighting gel layer are affected by the lighting gel layer in accordance with the image used as the lighting gel layer. In one or more implementations light rays not passing through the lighting gel layer have a radiance of zero. Accordingly, light rays not passing through the lighting gel layer do not result in the emissive layer altering the appearance or illumination of locations on a canvas or 3D object based on those light rays.

The lighting gel layer is in 2D space rather than being modeled in 3D space and thus the multi-layer light source need not model the texture of the lighting gel layer in 3D space. Accordingly, the multi-layer light source system need not make a 3D geometry in the lighting gel layer and need not make any specific materials of the lighting gel texture in 3D space in the lighting gel layer. However, the lighting gel layer adjusts the emissions from the emissive layer, creating lighting effects similar to or consistent with the lighting effects that are generated by constructing 3D geometry and 3D material.

In one or more implementations, an image generation system determines the color of a location (e.g., a pixel) on a canvas or a 3D object that one or more light rays from the emissive layer intersect based on the radiance of the one or more locations of the lighting gel layer that the one or more light rays pass through. The image generation system uses any of a variety of public or proprietary techniques to determine the color of the location on the canvas or the 3D object based on the underlying color of the canvas or 3D object at that location, the radiances of the one or more light rays intersecting that location and the lighting gel layer, the colors of the lighting gel layer at the one or more locations that the one or more light rays pass through, a color of the emissive layer, combinations thereof, and so forth.

In one or more implementations the multi-layer light source system determines areas of shadows cast by objects in the 3D space, including the direction and length of shadows. Shadows are cast by a 3D object onto a canvas, onto another 3D object, or onto the 3D object itself An indication of the locations or areas of shadows on a canvas or 3D object are provided to an image generation system, allowing the image generation system to generate the shadow in those locations or areas (e.g., by not tracing a light ray from the shadow locations to the emissive layer and not modifying the shadow locations based on the emissive layer or the lighting gel layer).

In one or more implementations, the emissive layer is an area including multiple points (e.g., an ellipse) rather than a single point. Accordingly, shadows are cast due to the 3D object differently than if the emissive layer is a single point. For example, because the emissive layer is an area larger than a single point (e.g., is an ellipse), multiple rays from the emissive layer pass through the lighting gel layer and intersect each location (e.g., each pixel) of the object and canvas. This results in areas of soft shadows being cast, which are areas on the object or canvas where some rays from the emissive layer are occluded by an object and other rays are not occluded. Furthermore, in areas where shadows are not cast (or within the soft shadow area), the multiple rays from the emissive layer passing through different locations of the lighting gel layer and intersecting each location (e.g., each pixel) of the object and canvas result in an area of blur.

The emissive layer is determined by receiving a user input referred to as a blur kernel. The user input is received in any of a variety of different manners, such as the user drawing of an area (e.g., an ellipse) on a canvas. For example, given an elliptical blur kernel on the canvas, the elliptical blur kernel is mapped to an elliptical emissive layer for use in the multi-layer light source.

In one or more implementations, the scale of emission by the multi-layer light source is changed due to shadows or blurriness. This change in the scale of emission keeps the irradiance on the canvas approximately unchanged despite any shadowing or blurriness. Accordingly, users perceive little or no change in the overall brightness of the object or canvas despite the presence of blurring or shadows. The change in the scale of emission is performed by changing the out-going radiance from the emissive layer. The out-going radiance from the emissive layer is changed, for example, in response to a change in intensity of the emissive layer, a change in the distance of the lighting gel layer from the 3D object or canvas, or a change in position of the lighting gel layer in an x-y plane.

The techniques discussed herein allow user interaction with a 2D space to create and edit the multi-layer light source. This alleviates the need for the user to interact with a 3D object in 3D space in order to depict interactions of the 3D object with light, such as shadows and highlights. Thus, the user interface is simplified, allowing the user to interact with simple 2D controls (e.g., a slider control) to set lighting parameters for the multi-layer light source.

Furthermore, the techniques discussed herein reduce resource usage in a computing device (e.g., memory, processor capacity) by allowing user interaction with the 2D space to create and edit the multi-layer light source rather than interacting with the 3D object in 3D space. The resources needed to model the 3D object in 3D space for purposes of depicting interactions of the 3D object with light need not be expended.

Term Descriptions

These term descriptions are provided for purposes of example only and are not intended to be construed as limiting on the scope of the claims.

The term "texture" refers to various colors or shades of colors that are, for example, applied to a canvas or object. Examples of texture include different colors, different shades of the same color (e.g., to give an appearance of peaks and valleys on a surface), and so forth.

The term "multi-layer light source" refers to a light source including an emissive layer and one or more lighting gel layers. Each lighting gel layer has a texture that introduces variations to the emission from the emissive layer.

In the following discussion, an example environment is first described that employs examples of techniques described herein. Example procedures are also described which are performable in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ the multi-layer lighting source with textured lighting gel layer described herein. The illustrated environment 100 includes a computing device 102, implemented in any of a variety of ways. Examples of the computing device 102 include a mobile device (e.g., assuming a handheld configuration such as a tablet or mobile phone), a wearable device (e.g., augmented reality or virtual reality headsets, smartwatches), a laptop computer, a desktop computer, a game console, an automotive computer, and so forth. Thus, implementations of the computing device 102 range from full resource devices with substantial memory and processor resources (e.g., personal computers, game consoles) to a low-resource device with limited memory and/or processing resources (e.g., mobile devices). Additionally, although a single computing device 102 is shown, additionally or alternatively the computing device is representative of a plurality of different devices, such as multiple servers utilized by a business to perform operations "over the cloud" as described in FIG. 17.

The computing device 102 is illustrated as including an application 104 that includes a multi-layer light source system 106 and an image generation system 108. The application 104 processes and transforms digital content 110, which is illustrated as maintained in storage 112 of the computing device 102. Such processing includes creation of the digital content 110 and rendering of the digital content 110 in a user interface 114 for output, e.g., by a display device 116. The storage 112 is any of a variety of different types of storage, such as random access memory (RAM), Flash memory, solid state drive, magnetic disk drive, and so forth. Although illustrated as implemented locally at the computing device 102, additionally or alternatively functionality of the application 104, including the multi-layer light source system 106 and the image generation system 108, is implemented in whole or part via functionality available via a network 118, such as part of a web service or "in the cloud."

The computing device 102 also includes an operating system 120 that implements functionality to manage execution of application 104 as well as other applications on the computing device 102, to operate as an interface between the application 104 and hardware of the computing device 102, and so forth. Although illustrated as being included in the application 104, additionally or alternatively the multi-layer light source system 106 is included in the operating system 120.

The multi-layer light source system 106 implements functionality to provide a multi-layer light source. In one or more implementations, the multi-layer light source system 106 includes two layers, an emissive layer and a textured lighting gel layer. The emissive layer is a diffuse area light source with a constant emission and the lighting gel layer introduces variations to the emission. The lighting gel layer is mapped with a texture (e.g., for colored shadows) without modeling a 3D scene. The two layers together cast the texture with different effects. To cast lighting on a planar canvas in 2D design, the multi-layer light source is created and edited in the 2D canvas directly without switching to a 3D space. Thus, the user need not be very knowledgeable or experienced with 3D design, and the workload is alleviated accordingly.

The image generation system 108 implements functionality to display a scene including 3D objects. The colors displayed on the objects vary based on the lighting gel layer of the multi-layer light source 106 as discussed in more detail below. For example, an object (a rock) and a lighting gel layer (the letters Ai) are illustrated at 122. The image generation system 108, using the multi-layer light source 106, displays the object with the lighting gel layer projected onto the object as illustrated at 124.

Although a single application 104 is illustrated in FIG. 1, any number of applications are includable in the computing device 102. Any additional applications included in the computing device 102 optionally include a multi-layer light source system 106 to provide a multi-layer light source.

In general, functionality, features, and concepts described in relation to the examples above and below are employable in the context of the example systems and procedures described herein. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combined in different ways. Thus, individual functionality, features, and concepts described in relation to different example environments, devices, components, figures, and procedures herein are usable in any suitable combinations and are not limited to the particular combinations represented by the enumerated examples in this description.

Multi-Layer Light Source System Architecture

Figure 2:
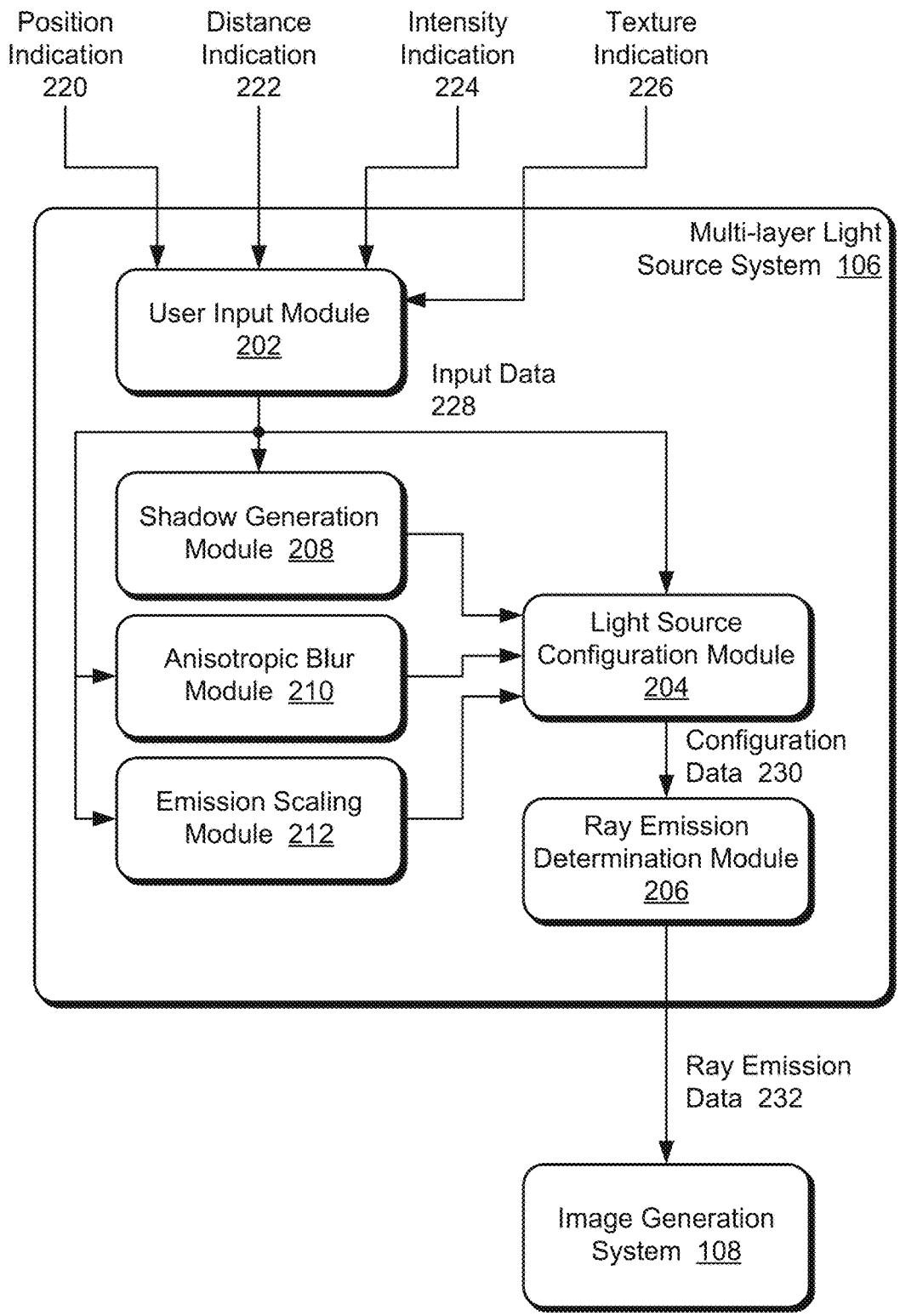
FIG. 2 is an illustration of an example architecture of a multi-layer light source system.

FIG. 2 is an illustration of an example architecture of a multi-layer light source system 106. The multi-layer light source system 106 includes a user input module 202, a light source configuration module 204, a ray emission determination module 206, a shadow generation module 208, an anisotropic blur module 210, and an emission scaling module 212. In one or more implementations, the multi-layer light source system 106 is a dual-layer light source model that provides varying light emission by placing a lighting gel layer in front of an emissive layer. In one or more implementations the emissive layer is a diffuse emitter that shines a single color that is changed as it passes through the lighting gel layer. This is performed using, for example, ray-tracing or projective geometry. The lighting gel layer is mapped with a texture and is implementable in various 2D manners, such as pixel images, raster images, vector art, and so forth. The techniques discussed herein allow complex appearances to be produced intuitively without creating extra 3D geometries or light sources.

Generally, the user input module 202 receives user inputs controlling the multi-layer light source, such as a position indication 220 of the multi-layer light source (in 2D space), a distance indication 222 identifying a distance between the lighting gel layer, and a canvas or 3D object on which the shadow is projected, an intensity indication 224 identifying the intensity of emitted light passing through the lighting gel layer, and a texture indication 226 identifying a texture for the lighting gel layer of the multi-layer light source. The user input module 202 provides the various user inputs to the light source configuration module 204, the shadow generation module 208, the anisotropic blur module 210, and the emission scaling module 212 as input data 228. In one or more implementations the same input data 228 is provided to all of the modules 204, 208, 210, and 212. Additionally or alternatively, different input data 228 is provided to different ones of the modules 204, 208, 210, and 212 depending on the functionality implemented by the particular module.

The light source configuration module 204 configures the multi-layer light source based on the inputs received by the user input module 202. The ray emission determination module 206 determines the emission of light rays from the multi-layer light source. The shadow generation module 208 determines areas of shadows cast by 3D objects. The anisotropic blur module 210 determines a size of an emissive layer that is larger than a single point to blur the texture of the lighting gel layer. The emission scaling module 212 determines changes in the scale of emission by the multi-layer light source due to shadows or blurriness.

The light source configuration module 204 implements functionality to configure the multi-layer light source based on the inputs received by the user input module 202. This configuration includes, for example, modifying the emission of the emissive layer, setting the texture of the lighting gel layer, changing lighting parameters for the multi-layer light source that change the emissive layer or the lighting gel layer, and so forth. The light source configuration module provides configuration data 230 to the ray emission determination module 206. In one or more implementations the configuration data includes settings for the emissive layer and the lighting gel layer.

The ray emission determination module 206 implements functionality to provide ray emission data 232 to the image generation system 108. The ray emission data 232 is the final emission of the multi-layer light source ($L_{DLLS}$) as discussed in more detail below. The image generation system 108 uses the ray emission data 226 to display, based at least in part on the multi-layer light source 106, the texture from the lighting gel layer on a 2D canvas or 3D object.

More specifically, the user input module 202 implements functionality to receive user inputs controlling the multi-layer light source. The user input module 202 receives one or more of various different user inputs, such as a position indication 220 of the multi-layer light source (in 2D space), a distance indication 222 identifying a distance between the lighting gel layer from a 3D objects or a canvas on which a shadow is projected, an intensity indication 224 identifying the intensity of emitted light passing through the lighting gel layer and a texture indication 226 identifying a texture for the lighting gel layer. In one or more implementations, the position indication 220 indicates a position of the lighting gel layer of the multi-layer light source, allowing the shadows to be cast by the multi-layer light source as discussed in more detail below. These indications 220, 222, 224, and 226 are used by the multi-layer light source system 106 as discussed in more detail below.

In one or more implementations various additional user inputs are also received. Examples of such additional user inputs include a whether the emissive layer is a local or distant light source, a distance between the emissive layer and the lighting gel layer, a position of the emissive layer (e.g., in order to cast shadows), and so forth. Additionally or alternatively, default values are used by the multi-layer light source system 106 rather than user input values.

Figure 3:
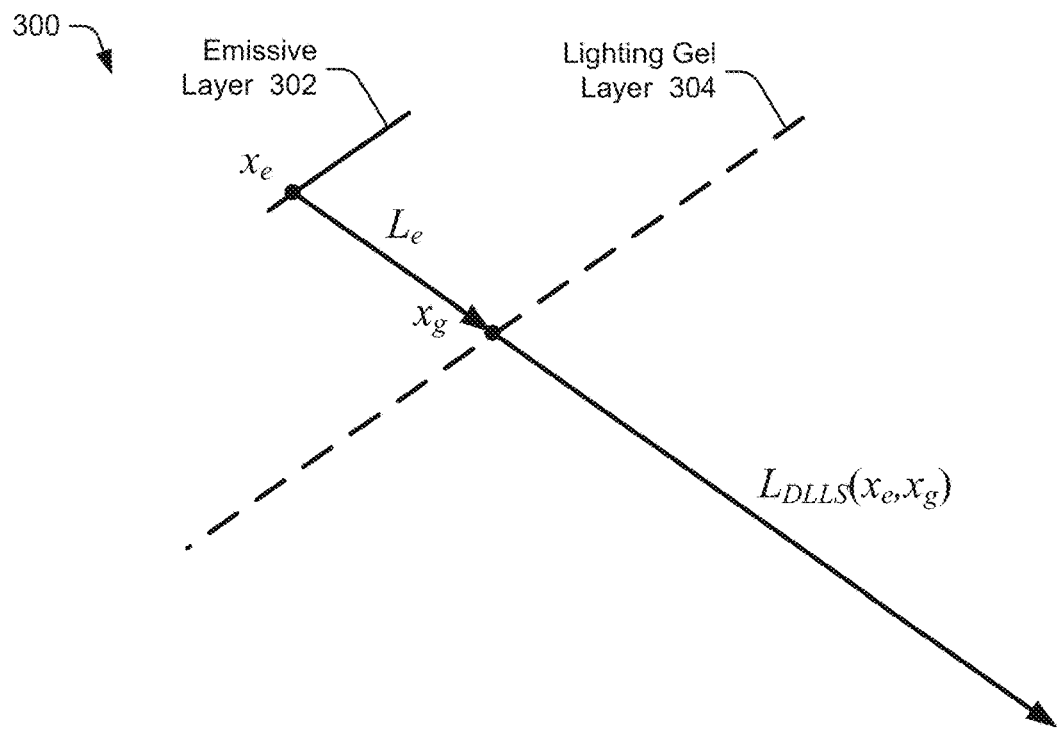
FIG. 3 illustrates an example multi-layer light source.

The ray emission determination module 206 implements functionality to determine the emission of light rays from the multi-layer light source. FIG. 3 illustrates an example multi-layer light source used by ray emission determination module 206. The multi-layer light source is a multi-layer light model 300 having two layers (a dual layer light source) including an emissive layer 302 and a lighting gel layer 304. In one or more implementations, the emissive layer is a constant diffuse emitter. The final emission $L_{DLLS}(x_e, x_g)$ of the multi-layer light model 300 along a light ray traced from a position $x_e$ on the emissive layer 302 is determined by its intersection of the lighting gel layer 304 at a position $x_g$. In one or more implementations, the lighting gel layer 304 is implemented as a spatial-variant but directional-constant bidirectional transmittance distribution function (BTDF). Additional information regarding the BTDF is found in "Microfacet models for refraction through rough surfaces" by Bruce Walter, Stephen R. Marschner, Hongsong Li, and Kenneth E. Torrance, Eurographics Symposium on Rendering (EGSR '07), page 195-206, Goslar, D E U, (2007), which is hereby incorporated by reference herein in its entirety. The BTDF models the transmission of light through a surface.

The final emission of the multi-layer light model 300 is determined as:

$$L_{DLLS}(x_e, x_g) = L_e f_t(x_g), x_e \in \Omega_e / x_g \in \Omega_g$$

where $x_e$ is the position on the domain of emissive layer ($\Omega_e$), $x_g$ is the position on the lighting gel layer 304 ($\Omega_g$), $L_e$ is the constant out-going radiance from emissive layer, and $f_t(x_g)$ is the BTDF at the position $x_g$ on the lighting gel layer 304 ($\Omega_g$).

The emissive layer 302 is implemented in various manners, for example as a single point or an area (e.g., an ellipse or other shape). The lighting gel layer 304 is one of any of a variety of different shapes, such as a rectangle, ellipse, outline of text, and so forth. The lighting gel layer 304 is generated based on any of a variety of different types of images or drawings, such as pixel images, raster images, vector art, and so forth.

The intersection of the light ray emitted from the emissive layer 302 with the lighting gel layer 304 is used for generating the final emission of the multi-layer light model 300 ($L_{DLLS}$). The lighting gel layer 304 is used for modeling the light source rather than treated as a real intersection when rendering (e.g., using Monte Carlo rendering). Illumination using the multi-layer light model 300 is simulated by tracing lighting paths or photons from the emissive layer 302 or intersecting camera paths with the emissive layer 302. Accordingly, the light ray is not traced from or intersected with the lighting gel layer 304 but rather traced from or intersected with the emissive layer 302. Thus, an object intersected by the ray segment $x_e \rightarrow x_g$ is illuminated with $L_{DLLS}$ rather than $L_e$.

Light rays passing through the lighting gel layer 304 are affected by the lighting gel layer 304 in accordance with the image used as lighting gel layer 304. In one or more implementations light rays not passing through the lighting gel layer 304 have a radiance of zero. Accordingly, light rays not passing through the lighting gel layer 304 do not result in the emissive layer 302 altering the appearance or illumination of locations on a canvas or 3D object based on those light rays. The lighting gel layer 304 is in 2D space rather than being modeled in 3D space and thus the multi-layer light source 106 need not model the texture of the lighting gel layer 304 in 3D space. Accordingly, the multi-layer light source 106 need not make a 3D geometry in the lighting gel layer 304 and need not make any specific materials of the lighting gel texture in 3D space in the lighting gel layer 304. However, the lighting gel layer 304 adjusts the emissions from the emissive layer 302, creating lighting effects similar to or consistent with the lighting effects that are generated by constructing 3D geometry and 3D material.

Figure 4:
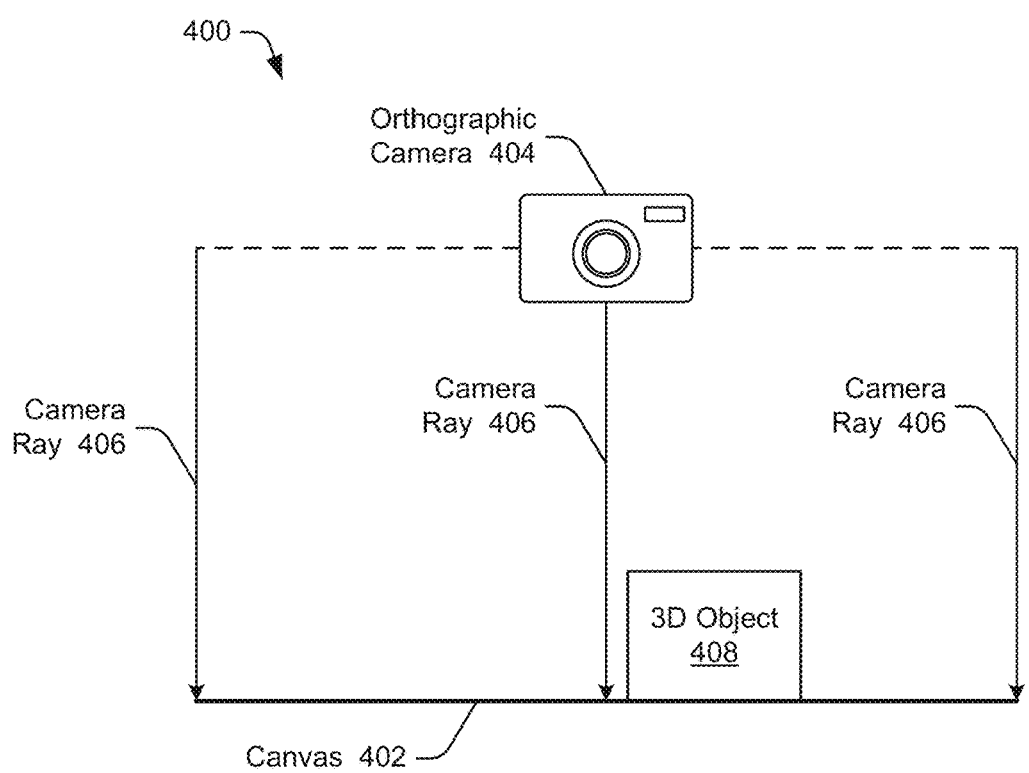
FIG. 4 illustrates an example system using the multi-layer light source system.

User inputs for interacting with (e.g., modifying) the multi-layer light source system 106 are received with reference to an orthographic view of a canvas, allowing the user interaction to remain in 2D space. FIG. 4 illustrates an example system 400 using the multi-layer light source system 106. The system 400 assumes a canvas 402 is a rectangle (or other shape) which is placed at the origin $[0, 0, 0]^T$, where the $[\ldots]^T$ notation indicates a transpose of the matrix $[\ldots]$. The normal of the canvas is the z axis, which is $[0, 0, 1]^T$. The view is fixed with an orthographic camera 404 placed at $[0, 0, +\infty]^T$ and having a viewport that is aligned with the canvas 402, as illustrated by camera rays 406. One or more 3D objects, such as 3D object 408, are placed on the canvas 402 and rendered with different materials and lights, so the 2D design is rendered using 3D techniques. All interactions with lighting design are achieved within the orthographic view of canvas 402. Although a single 3D object 408 is illustrated, alternatively multiple 3D objects are placed on the canvas 402.

The light source configuration module 204 implements functionality to configure the multi-layer light source based on the inputs received by the user input module 202. One such configuration performed by the configuration module 204 is setting the texture of the lighting gel layer.

Figure 5:
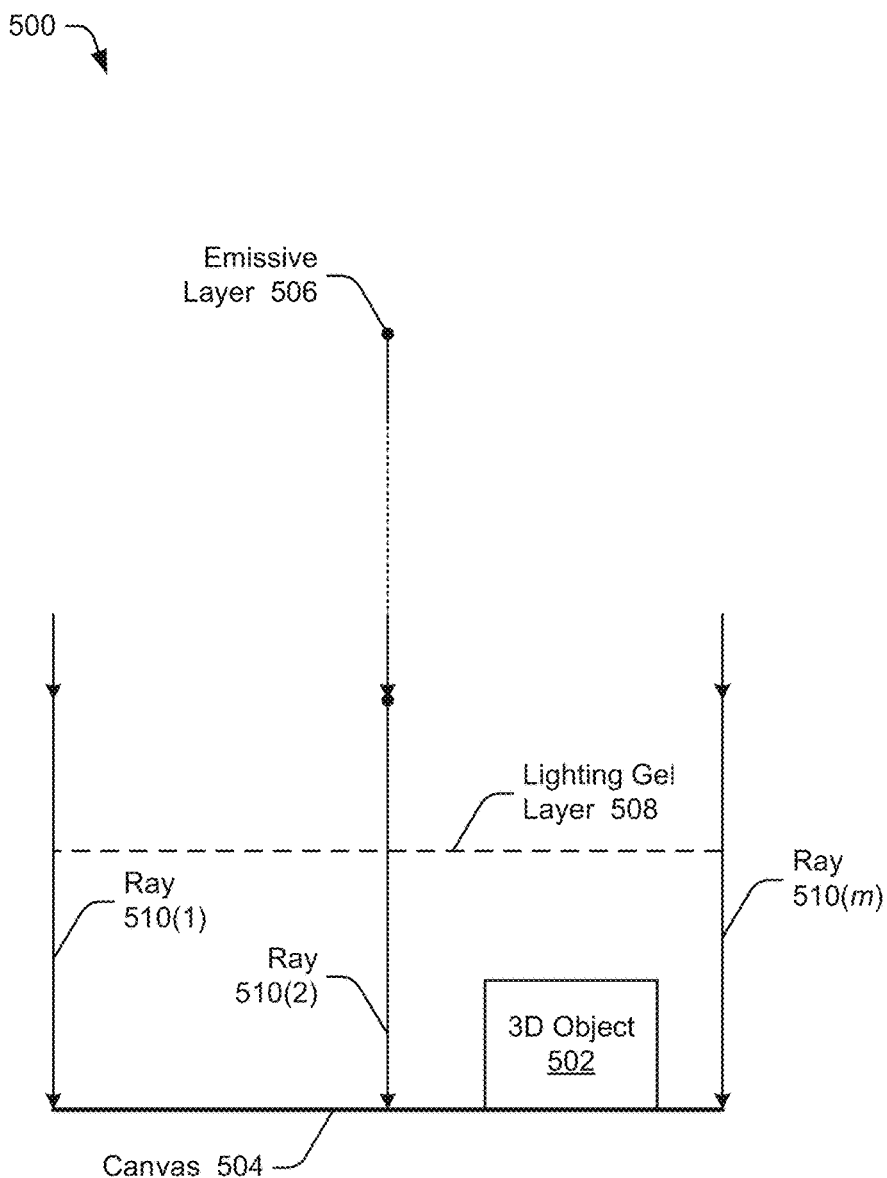
FIGS. 5, 6, 7, and 8 illustrate examples of a multi-layer light source and light rays intersecting a canvas.

FIG. 5 illustrates an example 500 of a multi-layer light source and light rays intersecting a canvas. The example 500 includes a 3D object 502, which is any 3-dimensional shape or geometry, on a canvas 504. The multi-layer light source includes an emissive layer 506 and a lighting gel layer 508. In one or more implementations, user input specifying the texture of the lighting gel layer 508 is received. This user input is in any of a variety of different forms, such as dragging and dropping a texture (e.g., an image or drawing) on the canvas 504, user input of a file name or location of a texture (e.g., an image or drawing file), and so forth.

The texture is at position $[x_t, y_t, 0]^T$ and is scaled to be with dimension $w_t \times h_t$, where $x_t$ refers to a position in the texture on the x axis, $y_t$ refers to a position in the texture on the y axis, $w_t$ refers to the width of the texture and $h_t$ refers to the height of the texture. In one or more implementations the emissive layer 506 and the lighting gel layer 508 are parallel to the canvas 504 and have normals that are the same as the negative z axis, which is $[0,0, -1]^T$. Having the emissive layer 506 and the lighting gel layer 508 parallel to the canvas 504 simplifies the calculations performed by the ray emission determination module 206 and the image generation system 108. Additionally or alternatively, the emissive layer 506 or the lighting gel layer 508 are at an angle other than parallel to the canvas 504.

The light source configuration module 204 maps the lighting gel layer 508 with the texture, places the lighting gel layer 508 at $[x_t, y_t, z_g]^T$, and scales the lighting gel layer 508 to be the same dimension $w_t \times h_t$, where $z_g$ refers to the location along the z axis of the lighting gel layer 508 (e.g., the height of the lighting gel layer 508 or the distance between the canvas 504) and $|z_g|$ is the distance between the lighting gel layer 508 and the canvas 504. The value of $z_g$ is determined in various different manners, such as a default setting, a user input specifying the value, and so forth. In the illustrated example 500 the emissive layer 506 is degenerated to a point at $[0,0, +\infty]^T$. Additionally or alternatively, the emissive layer 506 takes various shapes (e.g., an ellipse) as discussed in more detail below. In one or more implementations the value $|z_g|$ is large enough to be outside a bounding box of all 3D objects (e.g., 3D object 502). The emissive layer 506 along with the lighting gel layer 508 cast the emission pattern of the lighting gel layer 508 texture onto the canvas 504 and 3D object 502. After the lighting gel layer 508 is mapped with the texture, the texture, if still present on the canvas 504, is deleted from the canvas 504.

Multiple (m) light rays 510(1), . . . , 510(m) emanate from the emissive layer 506, pass through the lighting gel layer 508, and illuminate the 3D object 502 and the canvas 504. The image generation system 108 determines the color of each location (e.g., each pixel) on the canvas 504 (as well as each location (e.g., each pixel) on the 3D object 502) based on a texture or color of the canvas and the multi-layer light source. In one or more implementations, the image generation system 108 traces each light ray intersecting the canvas 504 or the 3D object 502 back to the emissive layer 506. Some of these light rays 520 intersect the lighting gel layer 508, but in some situations, depending on the dimensions of the lighting gel layer 508, some of these light rays 510 do not intersect the lighting gel layer 508. Additionally or alternatively, the image generation system 108 only traces each light ray intersecting one of the canvas 504 and the 3D object 502. The image generation system 108 traces the light rays using any of a variety of public or proprietary techniques, such as proper ray tracing techniques, projective geometry techniques, and so forth.

The image generation system 108 uses any of a variety of public or proprietary techniques to determine the color of a location on a canvas or a 3D object. Each light ray passing through the lighting gel layer carries a radiance ($L_{DLLS}$) that is determined by the intersection of the light ray with the lighting gel layer and is used by the image generation system 108 in determining the color of the location on the canvas or 3D object. In one or more implementations, the image generation system 108 determines the color of a location (e.g., a pixel) on the canvas 504 or the 3D object 502 that one or more light rays 510 intersect based on a combination (e.g., average) of the one or more colors that are in the lighting gel layer 508 that the one or more light rays 510 pass through. The image generation system 108 also accounts for shadowing and blurring as discussed in more detail below. Additionally or alternatively, the image generation system 108 determines the color of a location (e.g., a pixel) on the canvas 504 or the 3D object 502 that one or more light rays 510 intersect based on a combination of the one or more colors that are in the lighting gel layer 508 that the one or more light rays 510 pass through and the underlying color of the canvas 504 or 3D object 502 at that location (e.g., a weighted combination based on a transparency value for the lighting gel layer 508 optionally set by the user). Additionally or alternatively, the emissive layer 506 itself has a color other than white, in which case the image generation system 108 determines the color of a location (e.g., a pixel) on the canvas 504 or the 3D object 502 that one or more light rays 510 intersect based on the color of the emissive layer 506 as well.

Returning to FIG. 2, the shadow generation module 208 implements functionality to determine areas of shadows cast by objects in the 3D space. In the illustrated example 500 of FIG. 5, the emissive layer 506 of the multi-layer light source is distant and the lighting direction is perpendicular to the canvas 504. Accordingly, no shadows are rendered due to the 3D object 502. However, in some situations in which the lighting direction is not perpendicular to the canvas or the emissive layer of the multi-layer light source is not distant, 3D objects cast shadows on the canvas, other 3D objects, or other portions of the same 3D object. The shadow generation module 208 determines areas of shadows cast by a 3D object, including the direction and length of shadows.

The shadow generation module 208 receives input data 228 that includes the position indication 220 identifying a position of the multi-layer light source (e.g., of the emissive layer of the multi-layer light source). User inputs are optionally received adjusting the location of the multi-layer light source (e.g., the emissive layer of the multi-layer light source) in 2D space (e.g., along the x and y dimensions). This allows the user to provide input indicating a location of the multi-layer light source so as to have 3D objects cast shadows.

The shadow generation module 208 determines the locations or areas of shadows on a canvas or 3D object and provides an indication of those shadow locations or areas to the light source configuration module 204. The light source configuration module 204 provides the indication of the shadow locations or areas to the image generation system 108 allowing the image generation system 108 to generate the shadow in those locations or areas (e.g., by not tracing a light ray from the shadow locations to the emissive layer and not modifying the shadow locations based on the emissive layer or the lighting gel layer). Additionally or alternatively, the shadow generation module 208 provides the indication of shadow locations or areas to the image generation system 108 directly rather than via the ray emission determination module 206.

Figure 6:
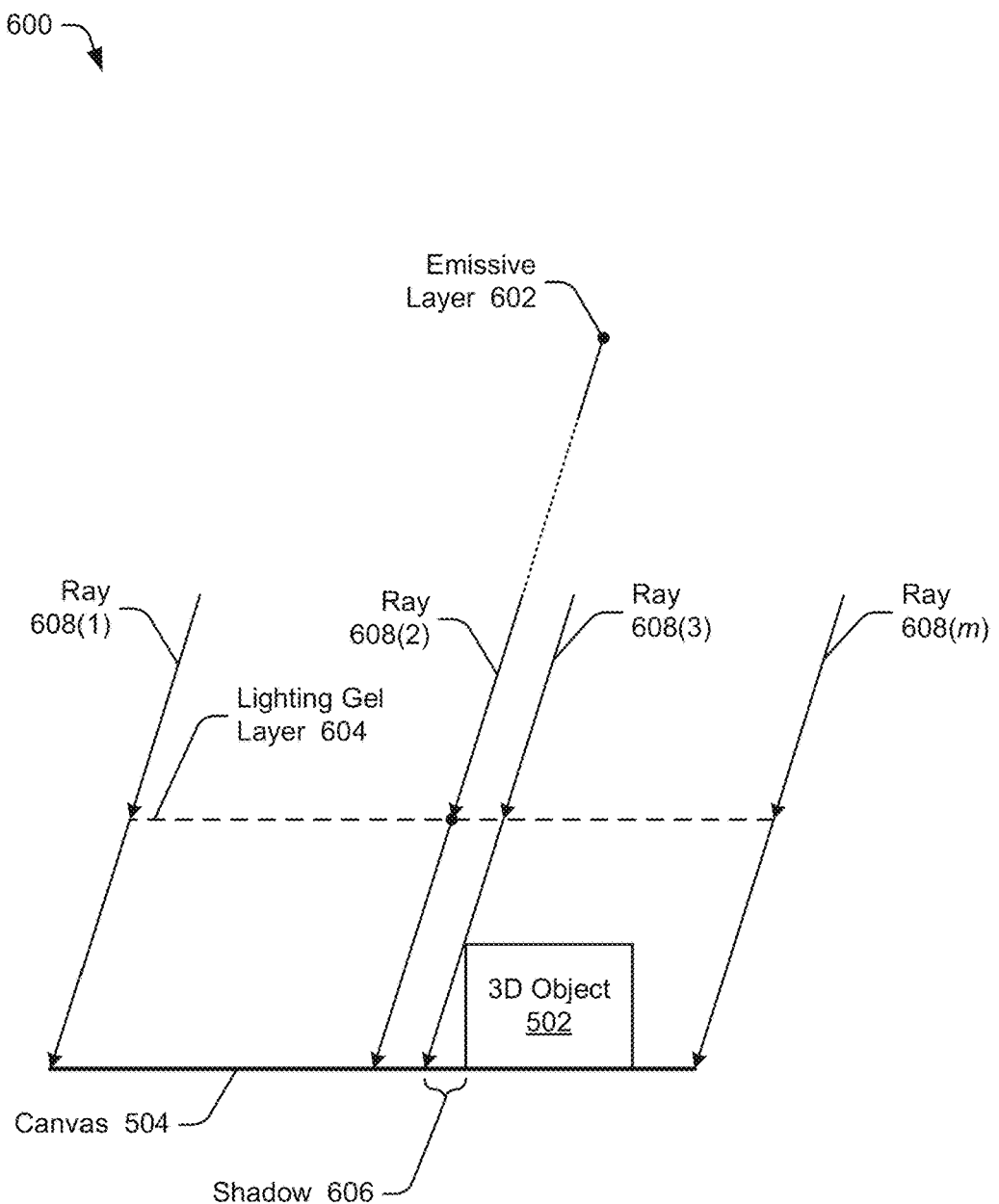

FIG. 6 illustrates another example 600 of a multi-layer light source and light rays intersecting a canvas. The example 600 includes an object 502 on a canvas 504 and a color or texture of the canvas 504 optionally set by a user input analogous to example 500 of FIG. 5. However, example 600 differs from example 500 in that in example 600 the lighting direction for the multi-layer light source is not perpendicular to the canvas 504 but has been shifted to the right. Accordingly, shadows are cast due to the 3D object 502.

The multi-layer light source includes an emissive layer 602 and a lighting gel layer 604. The multi-layer light source in example 600 is analogous to the multi-layer light source example in example 500 of FIG. 5, except that the direction from the lighting gel layer 604 to the emissive layer 602 is changed so that the lighting direction for the multi-layer light source is not perpendicular to the canvas 504. In one or more implementations, this change is in response to user input indicating a direction to move the emissive layer 602 in 2D space. Larger distances of movement result in larger changes in the lighting direction and larger shadows on the canvas 504 and 3D object 502.

The direction to cast the shadow is set as $[x_s, y_s]^T$ where $x_s$ refers to the movement of the emissive layer 602 relative to the lighting gel layer 604 in the x dimension, $y_s$ refers to the movement of the emissive layer 602 relative to the lighting gel layer 604 in the x dimension, and $x_s^2 + y_s^2 = 1$. Depending on the units used to indicate the direction to move the emissive layer 602, the amounts to move are scaled as appropriate so that $x_s^2 + y_s^2 = 1$. The parameter of shadow length is set as $\alpha_s \in (0,1]$, which is the dot product of the direction to cast the shadow $([x_s, y_s]^T)$ and the normal of the canvas 504. The direction of lighting $\omega_l$ is the determined as:

$$\omega_l = [-x_s\sqrt{1-\alpha_s^2}, -y_s\sqrt{1-\alpha_s^2}, \alpha_s]^T$$

and the lighting gel layer 604 is then calculated as:

$$[x_l, y_l, 0]^T + (z_g/\alpha_s)\omega_l^T$$

where the z coordinate of the lighting gel layer 604 is kept as $z_g$ (as in example 500 of FIG. 5). The calculated value for the lighting gel layer 604 shifts the lighting gel layer 604 in the x dimension or the y dimension by an amount based on the direction of lighting $\omega_l$ so that the light rays from the emissive layer 602 continue to pass through the lighting gel layer 604. The emissive layer 602 is translated to $[\omega_l^T, 0]^T$ where a 4-dimensional (4D) homogenous coordinate is used to represent an infinite position.

Given the direction of lighting $\omega_l$, one or more areas of shadows resulting from the 3D object 502 are readily identified. In the example 600, a shadow 606 is cast by the 3D object 502 given the direction of lighting as illustrated by light rays 608(1), . . . , 608(m). The area of the shadow 606 is readily ascertained based on the dimensions of the 3D object 502 and the direction of lighting. Although illustrated as being cast on the canvas 504, situations also arise in which shadows are cast on other 3D objects, shadows are cast on one part of the 3D object 502 by another part of the 3D object 502, and so forth.

The image generation system 108 uses the one or more areas of shadows cast by the 3D object 502 in various different manners. In one or more implementations, light rays from the multi-layer light source do not intersect the canvas 504 in the area of the shadow so the image generation system 108 displays, for each location in the shadow, the color or texture of that location (unaltered by the multi-layer light source). Additionally or alternatively, the image generation system 108 displays a default color (e.g., black or grey) for each location in the shadow (e.g., indicating that the light rays from the multi-layer light source have been blocked). This default color is optionally combined with the color or texture of that location (e.g., a weighted combination of the default color and the color or texture of that location), resulting in the locations in the shadow being darkened but not completely the default color.

Figure 7:
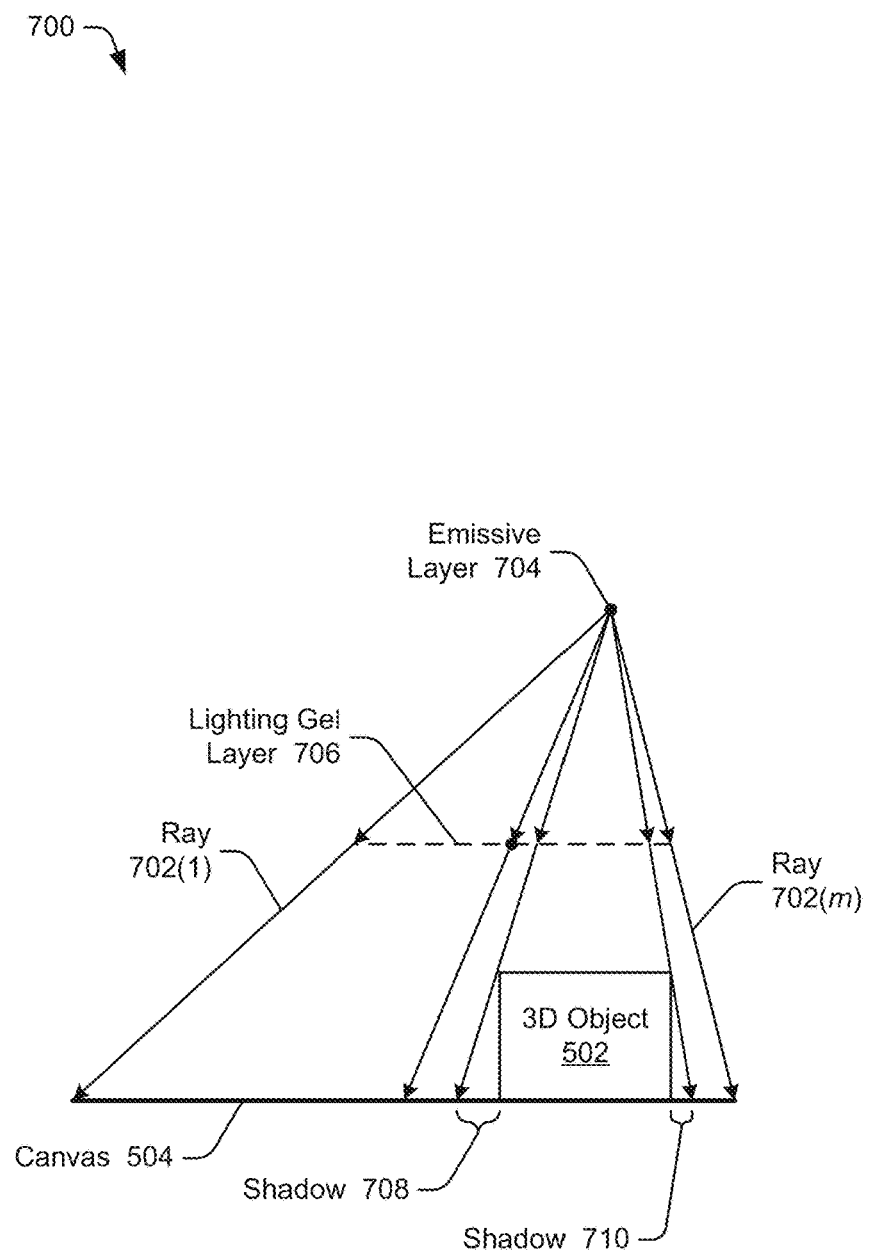

A distant light source, as illustrated in example 500, casts shadows along the same direction throughout the canvas. In contrast, a local (e.g., close) light source produces variations of shadows. FIG. 7 illustrates another example 700 of a multi-layer light source and light rays intersecting a canvas. The example 700 includes an object 502 on a canvas 504 and a color or texture of the canvas 504 optionally set by a user input analogous to example 500 of FIG. 5. Multiple (m) light rays 702(1), . . . , 702(m) emanate from the emissive layer 704, pass through the lighting gel layer 706, and illuminate the 3D object 502 and the canvas 504.

The example 700 illustrates shadows cast by the 3D object 502 analogous to example 600 of FIG. 6, however, example 700 differs from example 600 in that in example 700 the lighting source is local (e.g., emissive layer 704 is local). Accordingly, shadows are cast due to the 3D object 502 differently in example 700 than in example 600.

The shadow generation module 208 receives a parameter $\alpha_e \in [0,1)$, optionally set via user input, indicating how local the emissive layer 704 is. In one or more implementations, smaller values of $\alpha_e$ indicate a shorter distance between the emissive layer 704 and the lighting gel layer 706 (e.g., the emissive layer 704 is more local) and larger values of $\alpha_e$ indicate a longer distance between the emissive layer 704 and the lighting gel layer 706 (e.g., the emissive layer 704 is less local).

The shadow generation module 208 scales the lighting gel layer 706 to be $(1-\alpha_e)w_t \times (1-\alpha_e)h_t$ and the emissive layer 704 is translated to $[x_t, y_t, 0]^T + (z_e/\alpha_s)\omega_l^T$ with the z coordinate of the emissive layer 704 being $z_e = (z_g/\alpha_e)$.

Given the direction of lighting $\omega_l$, one or more areas of shadows resulting from the 3D object 502 are readily identified. In the example 700, a shadow 708 and a shadow 710 are cast by the 3D object 502 given the direction of lighting as illustrated by light rays $702(1), \ldots, 702(m)$. The area of the shadows 708 and 710 are readily ascertained based on the dimensions of the 3D object 502 and the direction of lighting $\omega_l$. Although illustrated as being cast on the canvas 504, situations also arise in which shadows are cast on other 3D objects, shadows are cast on one part of the 3D object 502 by another part of the 3D object 502, and so forth.

Figure 8:
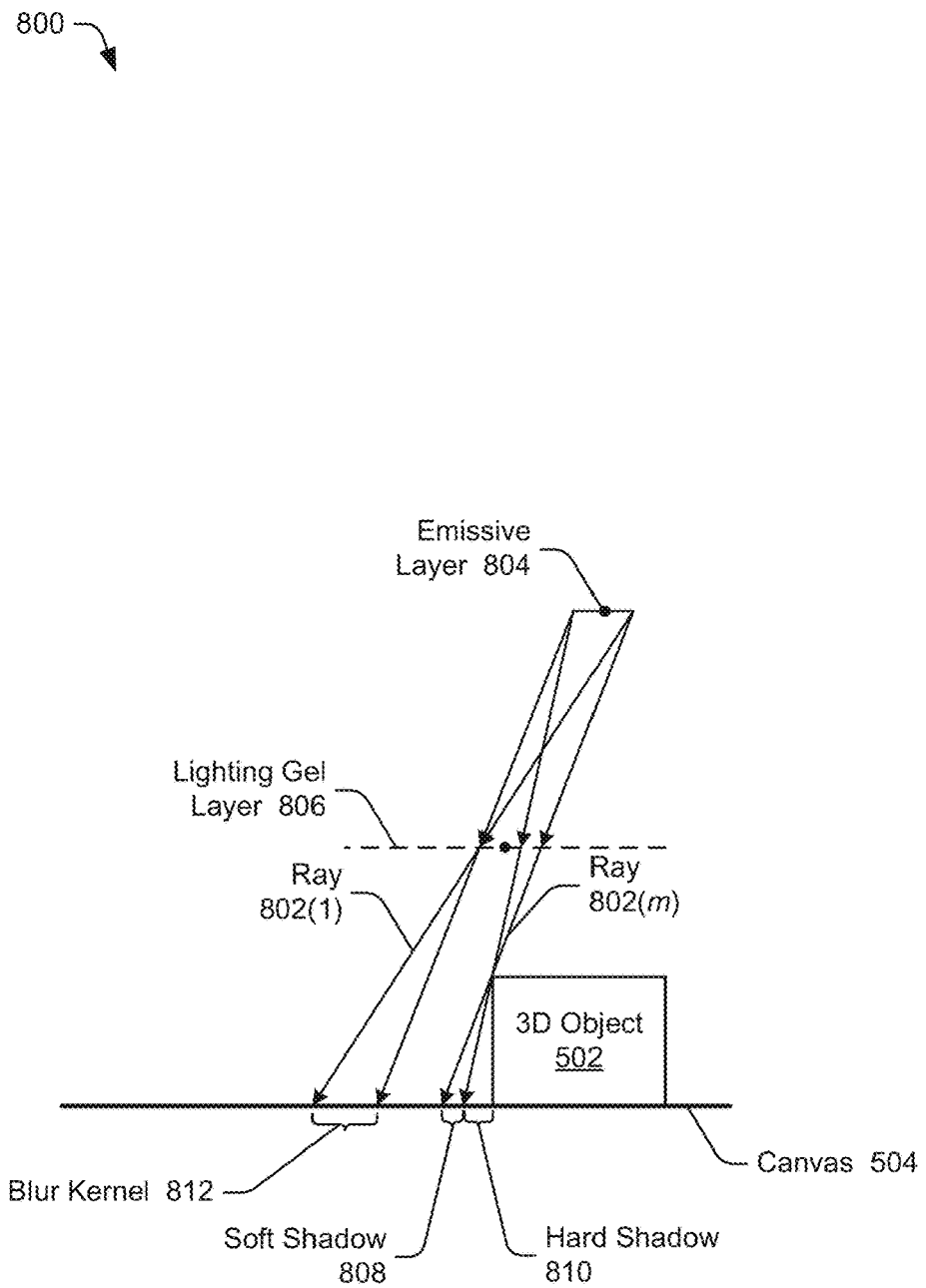

FIG. 8 illustrates another example 800 of a multi-layer light source and light rays intersecting a canvas. The example 800 includes an object 502 on a canvas 504 and a color or texture of the canvas 504 optionally set by a user input analogous to example 500 of FIG. 5. Multiple (m) light rays $802(1), \ldots, 802(m)$ emanate from the emissive layer 804, pass through the lighting gel layer 806, and illuminate the 3D object 502 and the canvas 504.

The example 800 illustrates shadows cast by the 3D object 502 analogous to example 700 of FIG. 7, however, example 800 differs from example 700 in that in example 800 the emissive layer 804 is an area including multiple points (e.g., an ellipse) rather than a single point. Accordingly, shadows are cast due to the 3D object 502 differently in example 800 than in example 700 and the texture from the lighting gel layer 804 is blurred in other areas of the canvas 504 where shadows are not cast.

For example, because the emissive layer 804 is an area larger than a single point (e.g., is an ellipse), multiple rays from the emissive layer 804 pass through the lighting gel layer 806 and intersect each location (e.g., each pixel) of the object 502 and canvas 504. This results in areas of soft shadows being cast, which are areas on the object 502 or canvas 504 where some rays from the emissive layer 804 are occluded by an object and other rays are not occluded. Accordingly, rather than a hard shadow where all light rays that would intersect a location on the canvas 504 or object 502 are occluded, only some of the light rays are occluded in the example 800. In the example 800 the area where a soft shadow 808 is cast is illustrated as well as the area where a hard shadow 810 is cast.

Furthermore, in areas where shadows are not cast (or within the soft shadow area), the multiple rays from the emissive layer 804 passing through different locations of the lighting gel layer 806 and intersecting each location (e.g., each pixel) of the object 502 and canvas 504 result in an area of blur.

The anisotropic blur module 210 implements functionality to determine the blur and soft shadows resulting from an emissive layer that is larger than a single point. In the examples of FIGS. 5, 6, and 7 above where the emissive layer is a single point, the pattern of incoming lighting on the canvas 504 is determined by the lighting gel layer texture only. However, in situations in which the emissive layer is an area larger than a single point, the lighting gel layer texture is blurred as discussed above. This allows, for example, soft lighting effects (e.g., blur and soft shadows) to be generated without creating a pre-generated lighting gel layer texture having those effects. In situations in which the lighting direction is not perpendicular to the canvas 504, the blurriness is anisotropic.

The anisotropic blur module 210 generates the soft lighting effects or blur by receiving user input, referred to as a blur kernel. An example of the area of the blur kernel is illustrated as blur kernel 812. The user input is received in any of a variety of different manners, such as the user drawing of an area (e.g., an ellipse) on the canvas 504. In one or more implementations, given an elliptical blur kernel on the canvas 504 having a semi-major axis of $k_a$ and a semi-minor axis of $k_b$, the anisotropic blur module 210 determines the emissive layer 804 to be an ellipse having a semi-major axis of $(1/\alpha_e - 1)k_a$ and a semi-minor axis of $(1/\alpha_e - 1)k_b$.

Furthermore, the anisotropic blur module 210 determines the major axis of the emissive layer 804 to be the same as the shadow direction, which is $[x_s, y_s, 0]^T$. This results in the anisotropies of both texture blurriness and soft shadows from 3D object being consistent. The anisotropic blur module 210 provides these determined values for the emissive layer 804 to the light source configuration module 204, which sets the various parameters of the emissive layer 804 to be the values determined by the anisotropic blur module 210.

The emission scaling module 212 implements functionality to determine changes in the scale of emission by the multi-layer light source due to shadows or blurriness. These changes in the scale of emission keep the irradiance on the canvas 504 approximately unchanged despite any shadowing or blurriness. Accordingly, users perceive little or no change in the overall brightness of the object 502 or canvas 504 despite the presence of blurring or shadows. The emission scaling module 212 scales $L_e$, which is the constant out-going radiance from the emissive layer as discussed above with reference to determining the final emission of the multi-layer light model ($L_{DLLS}$).

In one or more implementations, the emission scaling module 212 approximates the irradiance at the center of the canvas 504 (or center of texture on the canvas 504 if some portions of the canvas 504 have no texture) excluding the factor of the lighting gel layer. The irradiance $I([x_t, y_t, 0]^T)$ is approximated as:

$$I([x_t, y_t, 0]^T) \approx \hat{I}_c = L_e \frac{A_e \alpha_s^2}{\left(\frac{z_e}{\alpha_s}\right)^2} = \frac{\pi(1-\alpha_e)^2 \alpha_s^4 k_a k_b}{z_g^2} L_e$$

where $A_e$ is the area of emissive layer, $I([x_t, y_t, 0]^T)$ is the irradiance on canvas at $[x_t, y_t, 0]^T$, and $\hat{I}_c$ is the approximation of the irradiance on canvas. As discussed above, $\alpha_s$ refers to the shadow length, $\alpha_e$ refers to how local the emissive layer is, $k_a$ refers to the major axis of an elliptical blur kernel, $k_b$ refers to the minor axis of an elliptical blur kernel, $|z_g|$ refers to the distance between the lighting gel layer and the canvas, and $z_e$ refers to the z coordinate of the emissive layer. The irradiance on the canvas is kept approximately constant. Accordingly, the emission scaling module 212 generates a value for $L_e$ in response to a change in any of $\alpha_s$, $\alpha_e$, $k_a$, or $k_b$ as:

$$L_e \frac{\hat{I}_c z_g^2}{\pi(1-\alpha_e)^2 \alpha_s^4 k_a k_b}$$

The emission scaling module 212 provides these generated values for $L_e$ to the light source configuration module 204, which sets the value $L_e$ for the emissive layer 804 to be the generated value.

Figure 9:
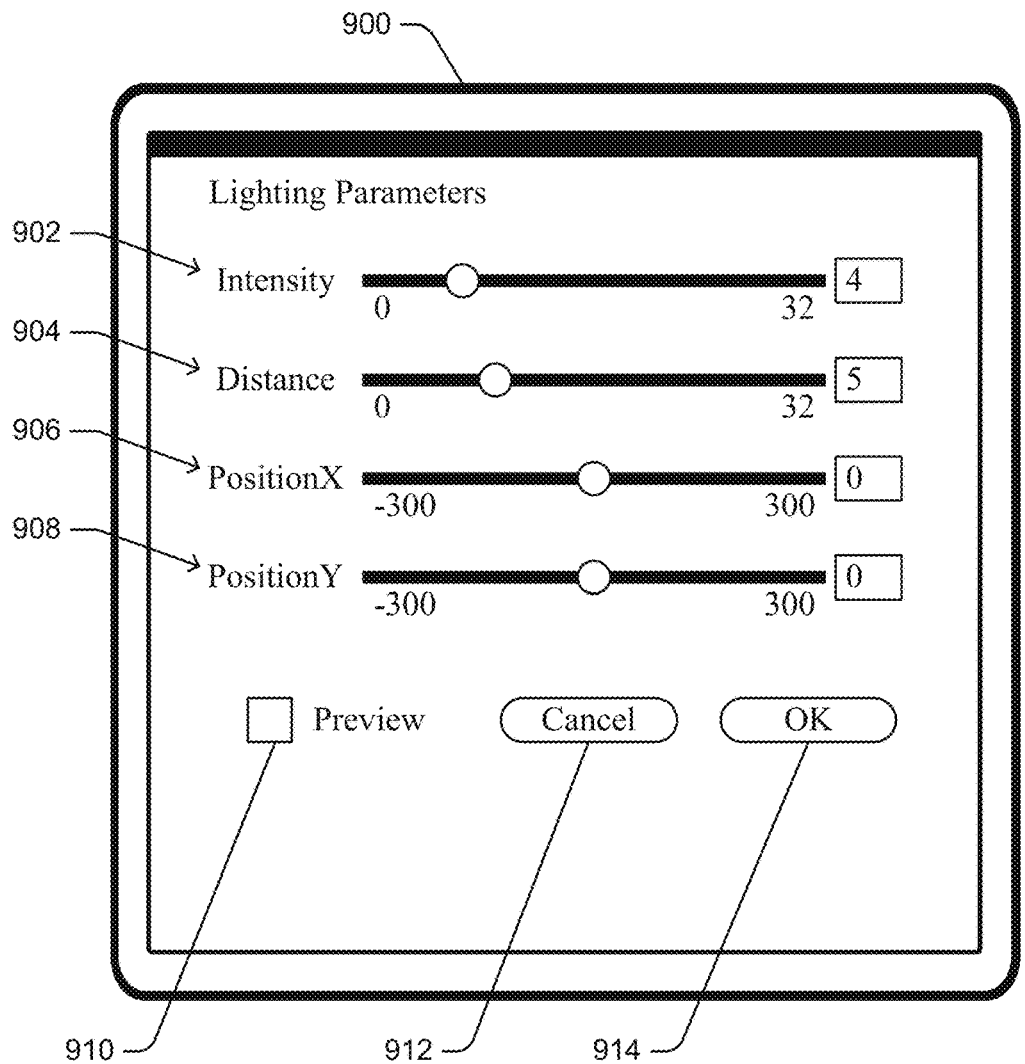
FIG. 9 illustrates an example user interface allowing user input to control various aspects of the multi-layer light source.

FIG. 9 illustrates an example user interface 900 allowing user input to control various aspects of the multi-layer light source. The user interface 900 displays controls 902, 904, 906, and 908 that are adjustable by a user in any of a variety of different manners, such as touch input, gesture input, keyboard input, voice input, and so forth. Each of the controls 902, 904, 906, and 908 is illustrated as a slider with a button that the user slides along a track to select a value that is displayed in a box adjacent to the track. Additionally or alternatively, the controls 902, 904, 906, and 908 receive user input in different manners, such as user input via a keyboard to enter a particular value (e.g., entering the value in the box adjacent to the track).

Figure 10:
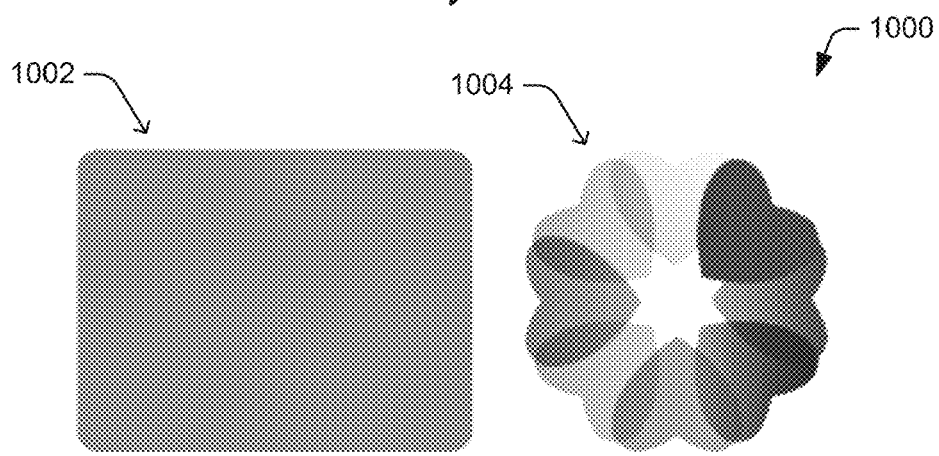
FIG. 10 illustrates an example of an object and a lighting gel layer used with the techniques discussed herein.

FIG. 10 illustrates an example 1000 of an object and a lighting gel layer used with the techniques discussed herein. The illustrated example 1000 includes an object 1000 and a lighting gel layer texture 1004. In the illustrated example 1000 the object 1000 is a 2D geometry that is mapped to a 3D geometry (e.g., by the image generation system 108 or another system or module) using any of a variety of public or proprietary techniques. Examples of mapping the 2D geometry to 3D geometry include using conventional effects such as bevel, extrude, revolve, and so forth. Additionally or alternatively, an object is created (e.g., by another system or module) as a 3D geometry and selected (e.g., imported or copied) by the user.

Figure 11:
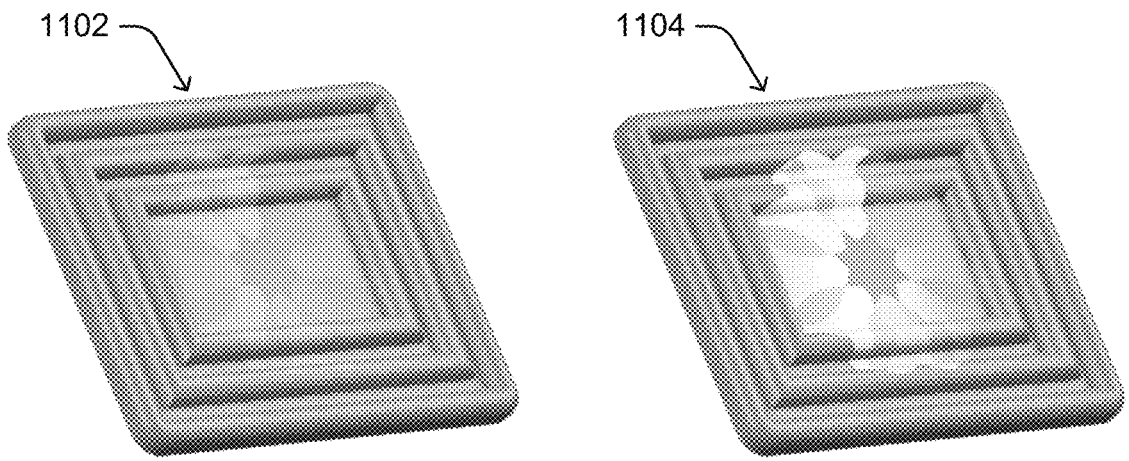
FIG. 11 illustrates examples of using different intensity values.

Returning to FIG. 9, the control 902 corresponds to an intensity parameter of the multi-layer light source. The intensity parameter controls the intensity of the emissive layer and thus controls the intensity of the emitted light passing through the lighting gel layer. In response to a user input specifying the intensity of the emissive layer, the light source configuration module 204 of FIG. 2 adjusts the intensity of the emissive layer in accordance with the user input. Higher intensity values result in brighter or crisper projections of the lighting gel layer on the canvas or 3D object than lower intensity values. The intensity values can be in various units, such as a custom unit that is the maximum intensity supported by the emissive layer 302 divided by a particular number (e.g., 33 in the illustrated example), illustrated as intensity values ranging from 0 to 32. FIG. 11 illustrates examples of using different intensity values. The texture from the lighting gel layer projected onto a 3D object with a lower intensity value is illustrated at example 1102 and the texture from the lighting gel layer projected onto a 3D object with a higher intensity value is illustrated at example 1104.

Figure 12:
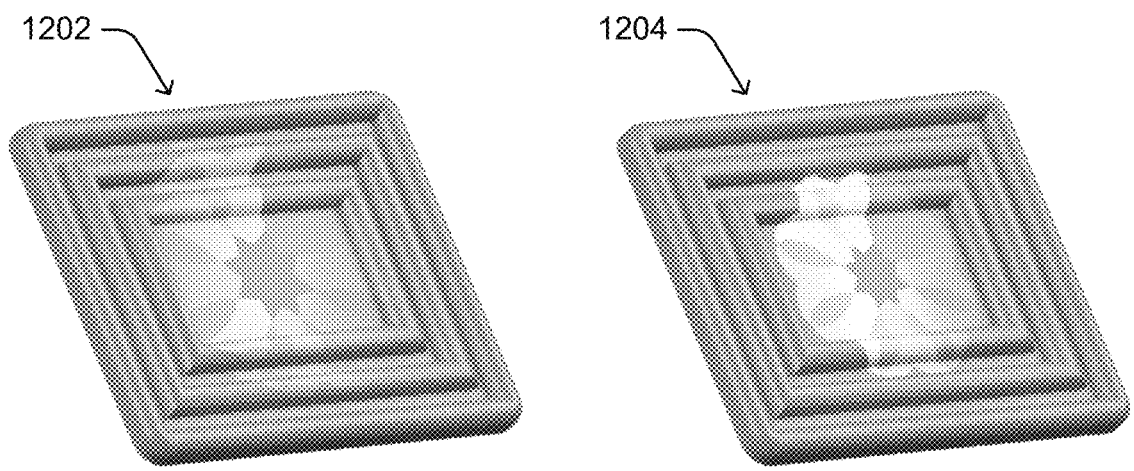
FIG. 12 illustrates examples of using different distance values.

The control 904 corresponds to a distance parameter of the multi-layer light source. The distance parameter controls the distance of the lighting gel layer from the 3D object or canvas. In response to a user input specifying the distance of the lighting gel layer from the 3D object or canvas, the light source configuration module 204 of FIG. 2 adjusts the intensity of the distance of the lighting gel layer from the 3D object or canvas ($z_g$) in accordance with the user input. Larger distance values result in larger projections of the lighting gel layer on the canvas or 3D object than smaller distance values. The distance values can be in various units, such as a custom unit that is the maximum supported (non-infinity) distance between the emissive layer 302 and the lighting gel layer 304 divided by a particular number (e.g., 33 in the illustrated example), illustrated as distance values ranging from 0 to 32. FIG. 12 illustrates examples of using different distance values. The texture from the lighting gel layer projected onto a 3D object with a larger distance value is illustrated at example 1202 and the texture from the lighting gel layer projected onto a 3D object with a smaller distance value is illustrated at example 1204.

Figure 13:
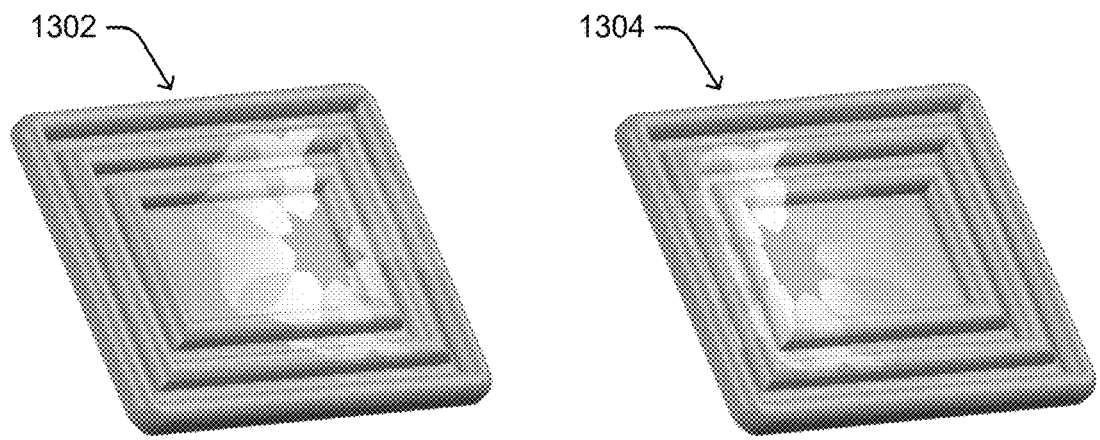
FIG. 13 illustrates examples of changing the position parameter values.

The controls 906 and 908 correspond to position parameters of the multi-layer light source. The position parameter controls the position of the lighting gel layer with respect to the 3D object or canvas allowing the projection of the lighting gel layer to be displayed in the X-Y plane. In response to a user input changing the position of the lighting gel layer, the light source configuration module 204 of FIG. 2 changes the position of the lighting gel layer in accordance with the user input. Changing the X position parameter using the control 906 displaces the projection of the lighting gel layer on the canvas or 3D object in the X dimension. Changing the Y position parameter using the control 908 displaces the projection of the lighting gel layer on the canvas or 3D object in the Y dimension. The position values can be in various units, such as a custom unit that is the maximum movement of the lighting gel layer 304 in the X dimension (for control 906) or the Y dimension (for the control 908) divided by a particular number (e.g., 601 in the illustrated example), illustrated as position values ranging from −300 to 300. FIG. 13 illustrates examples of changing the position parameter values. The texture from the lighting gel layer projected onto a 3D object with one X position parameter is illustrated at example 1302 and the texture from the lighting gel layer projected onto a 3D object with a different (e.g., smaller) X position parameter is illustrated at example 1304.

The user interface 900 also includes additional controls including a checkbox 910, and buttons 912 and 914. The checkbox 910 allows the user to request that a preview of changes to the projection of the lighting gel layer on the canvas or 3D object be displayed to the user in response to each change to one of the controls 902, 904, 906, or 908. Selection of the cancel button 912 closes the user interface 900 without making any changes to the lighting parameters. Selection of the OK button 914 accepts the changes made to the lighting parameters via one or more of the controls 902, 904, 906, or 908.

Figure 14:
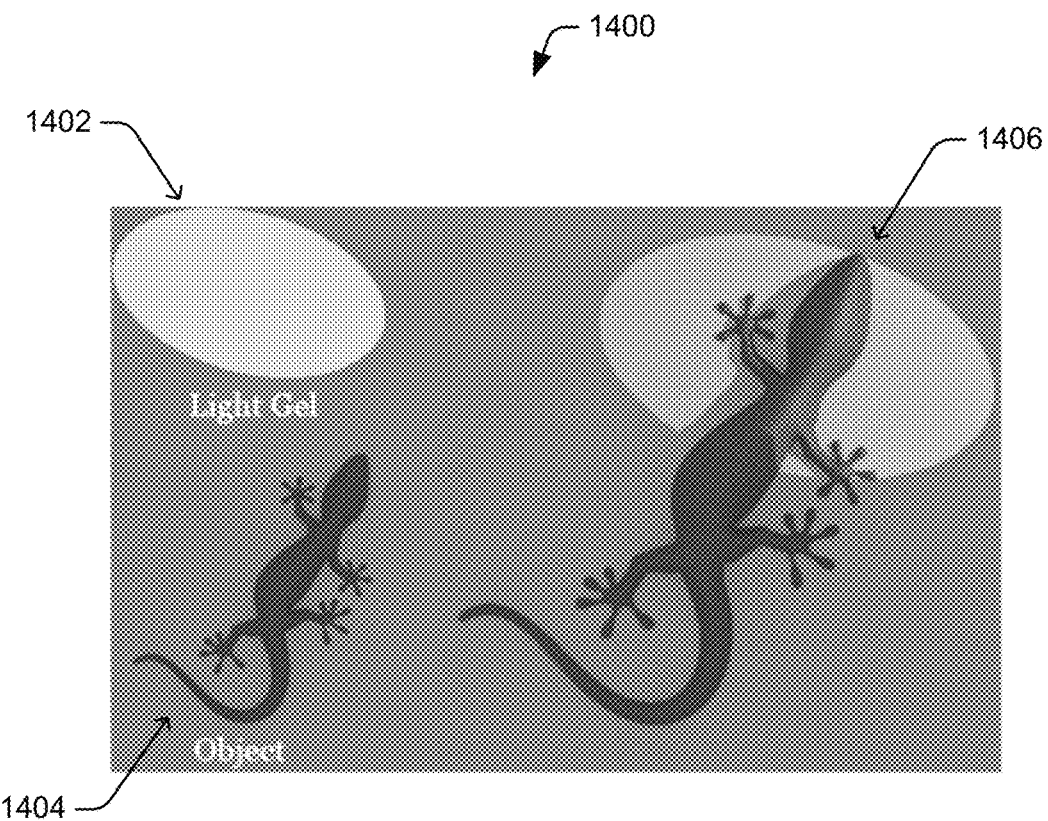
FIG. 14 illustrates another example of a lighting gel layer and 3D object.

FIG. 14 illustrates another example 1400 of a lighting gel layer and 3D object. The example 1400 includes a lighting gel layer 1402 and a 3D object 1404. The texture from the lighting gel layer 1402 projected onto the 3D object is illustrated at 1406. As illustrated, areas of shadows are shown at 1406 where portions of the 3D object 1404 occluded the multi-layer light source. Furthermore, as shown at 1406 the lighting gel layer 1402 is projected on a portion of the 3D object 1404 as well as the underlying canvas, but locations of the canvas and the 3D object 1404 for which light rays are not traced back to the emissive layer through the lighting gel layer 1402 are not altered by the multi-layer light source.

Returning to FIG. 1, the multi-layer light source 106 is discussed herein with examples including a single 3D object. However, the multi-layer light source 106 is usable with any number of 3D objects that, using the techniques discussed herein, each casts shadows on the canvas, on the 3D object itself, or on another 3D object.

Furthermore, the multi-layer light source 106 is discussed herein with reference to including a single lighting gel layer. Additionally or alternatively, the multi-layer light source 106 includes two or more lighting gel layers.

Figure 15:
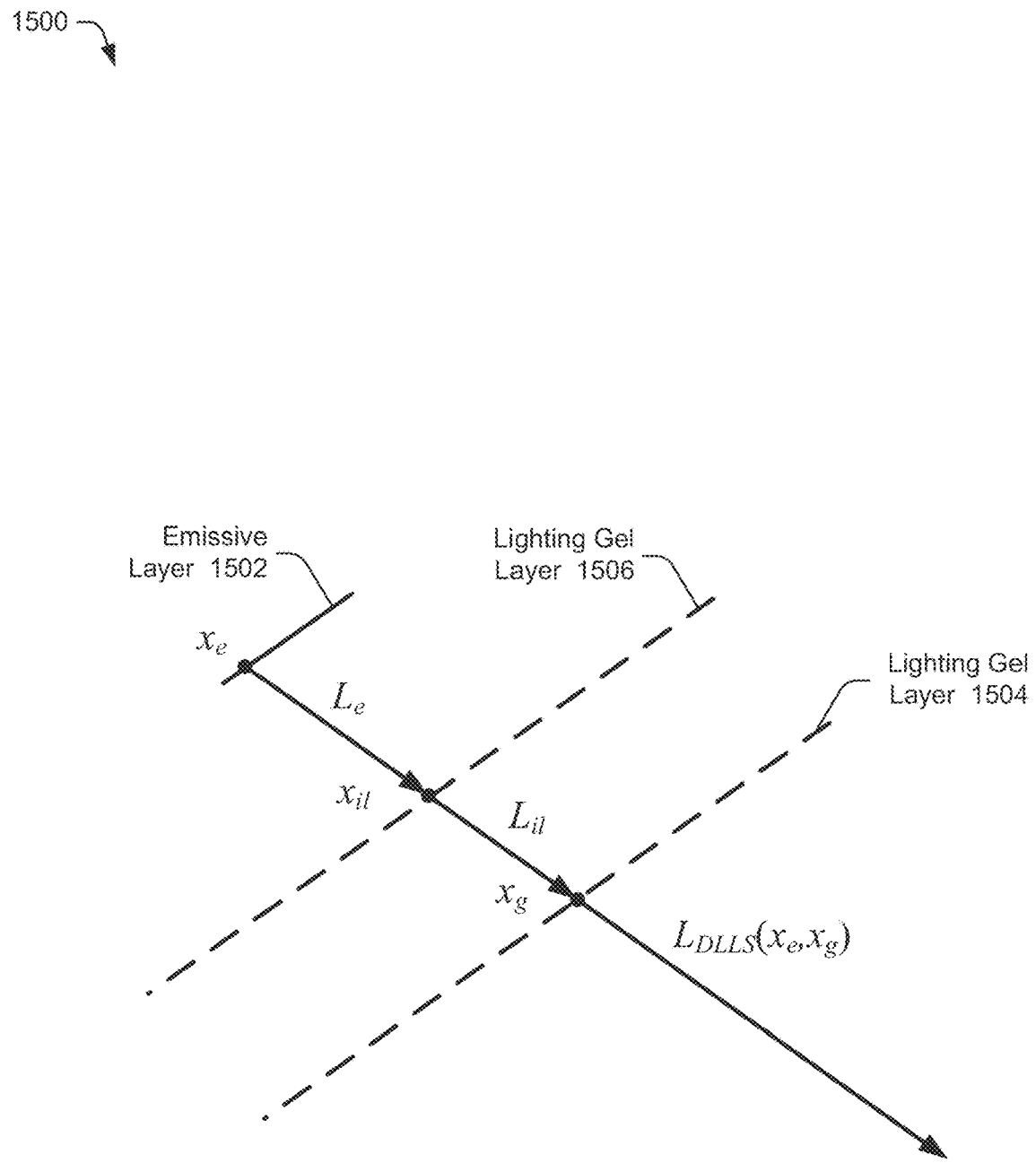
FIG. 15 illustrates another example multi-layer light source.

FIG. 15 illustrates another example multi-layer light source used by ray emission determination module 206 of FIG. 2. The multi-layer light source is a multi-layer light model 1500 similar to the multi-layer light model 300 of FIG. 3, except that an additional lighting gel layer is situated between the emissive layer 302 and the lighting gel layer 304. The multi-layer light model 1500 includes an emissive layer 1502 analogous to emissive layer 302 of FIG. 3 and a lighting gel layer 1504 analogous to the lighting gel layer 304 of FIG. 3. The emissive layer 1502 is a constant diffuse emitter. The final emission $L_{DLLS}(x_e, x_g)$ along a light ray traced from a position $x_e$ on the emissive layer 1502 is determined by its intersection of the lighting gel layer 1504 at a position $x_g$ and its intersection of the lighting gel layer 1506 at a position $x_{il}$. In one or more implementations, the lighting gel layers 1504 and 1506 are each implemented as a spatial-variant but directional-constant BTDF, analogous to lighting gel layer 304 of FIG. 3.

The lighting gel layer 1506 is implemented analogous to the lighting gel layers discussed above with various user inputs controlling the parameters of the lighting gel layer 1506. These include the X and Y positions values for the lighting gel layer 1506, changing a distance parameter for the lighting gel layer 1506, and so forth. The lighting gel layer 1506 is generated in the same manner as the lighting gel layers discussed above. For example, the user identifies a texture that is mapped to the lighting gel layer 1506. In one or more implementations different textures are mapped to the lighting gel layer 1504 and the lighting gel layer 1506. Additionally or alternatively, the same texture is mapped to both the lighting gel layer 1504 and the lighting gel layer 1506.

In one or more implementations, the dimensions of the lighting gel layer 1504 and the lighting gel layer 1506 are different (e.g., the dimensions of each lighting gel layer 1504 and 1506 are scaled to the dimensions of the texture mapped to the lighting gel layer). Additionally or alternatively, the dimensions of the lighting gel layers 1504 and 1506 are the same.

Example Procedures

The following discussion describes techniques that are implemented utilizing the previously described systems and devices. Aspects of the procedure are implemented in hardware, firmware, software, or a combination thereof. The procedure is shown as a set of blocks that specify operations performed by one or more devices and are not necessarily limited to the orders shown for performing the operations by the respective blocks. In portions of the following discussion, reference is made to FIGS. 1-15.

Figure 16:
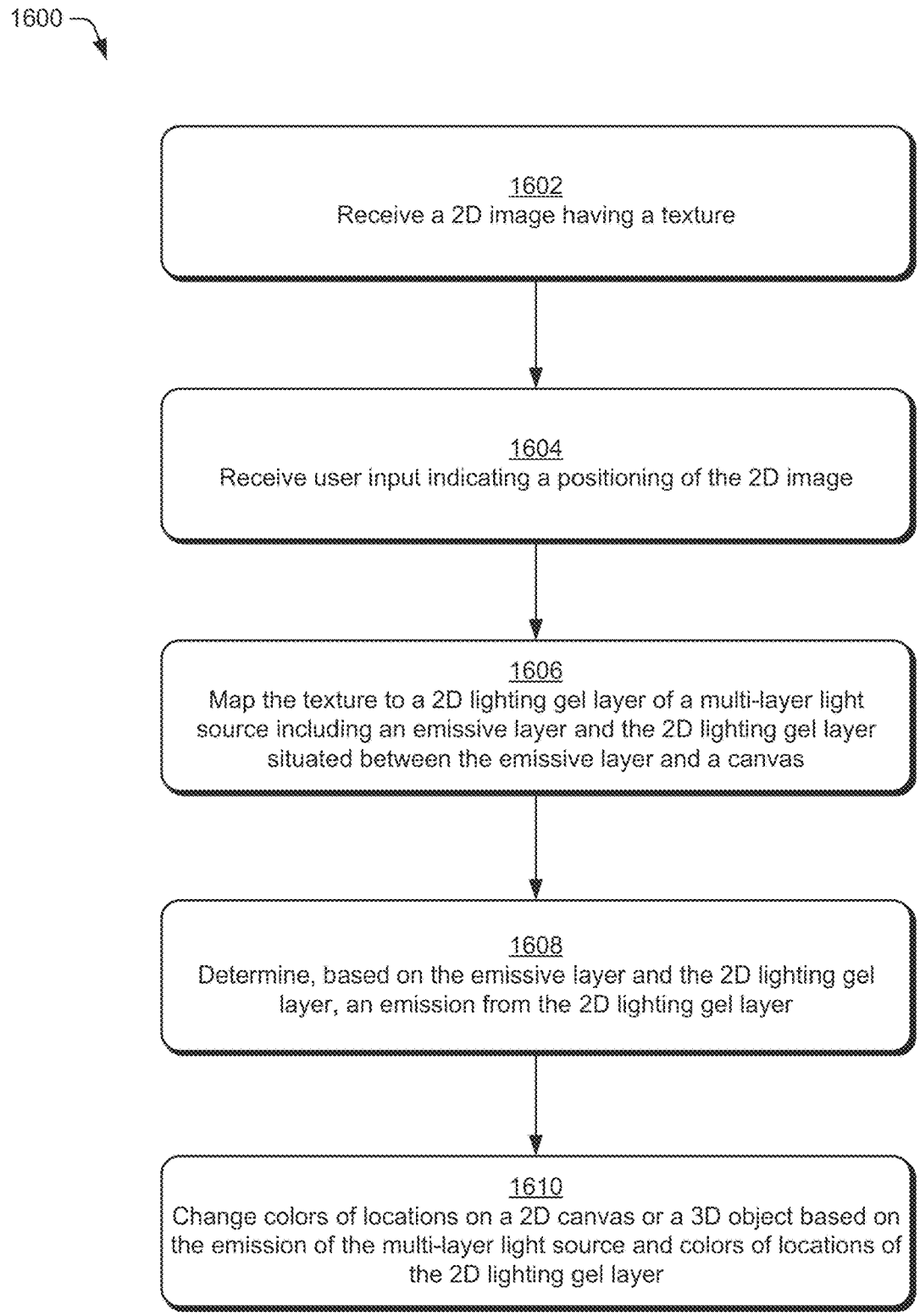
FIG. 16 is a flow diagram depicting a procedure in an example implementation of a multi-layer lighting source with textured lighting gel layer.

FIG. 16 is a flow diagram 1600 depicting a procedure in an example implementation of a multi-layer lighting source with textured lighting gel layer. In this example, a 2D image having a texture is received (block 1602). This image is received in various manners, such as being dragged and dropped onto a 2D canvas.

A user input indicating a positioning of the 2D image is received (block 1604). This positioning is a positioning of the 2D image on a 2D canvas or a 3D object.

The texture of the 2D image is mapped to a 2D lighting gel layer of a multi-layer light source (block 1606). The multi-layer light source includes an emissive layer and the 2D lighting gel layer situated between the emissive layer and the 2D canvas.

An emission from the 2D lighting gel layer is determined based on the emissive layer and the 2D lighting gel layer (block 1608). This determined emission is the emission of the multi-layer light source.

Colors of locations on the 2D canvas or the 2D object are changed based on the emission of the multi-layer light source and colors of locations of the workload lighting gel layer (block 1610). The color of a location on the 2D canvas or the 3D objects is changed based on the color of a location of the 2D lighting gel layer that a light ray passes through in illuminating the 2D canvas or the 3D object.

Example System and Device

Figure 17:
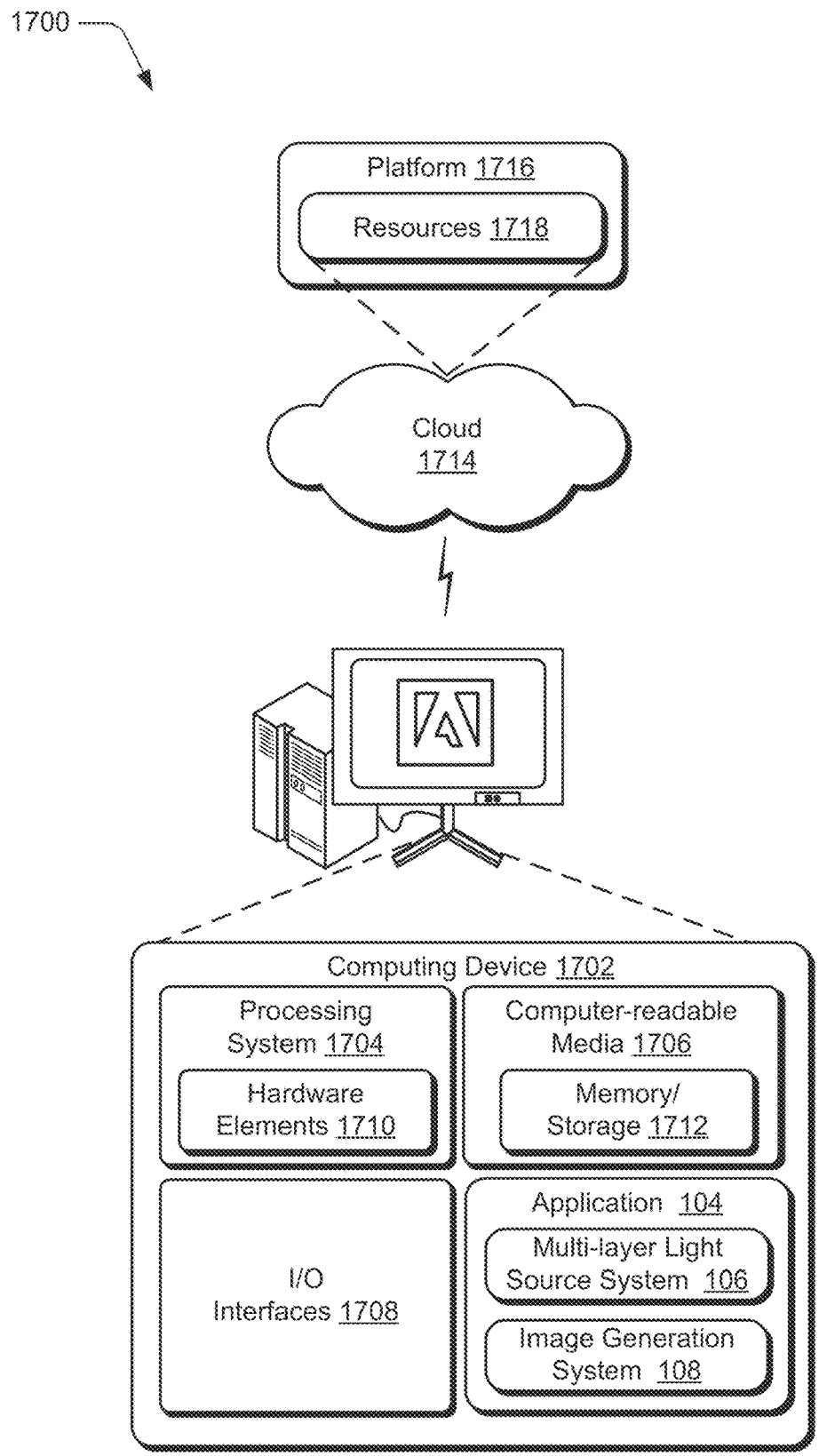
FIG. 17 illustrates an example system including various components of an example device that is implemented as any type of computing device as described and/or utilized with reference to FIGS. 1-16 to implement aspects of the techniques described herein.

FIG. 17 illustrates an example system generally at 1700 that includes an example computing device 1702 that is representative of one or more computing systems and/or devices that implement the various techniques described herein. This is illustrated through inclusion of the application 104 with the multi-layer light source 106 and the image generation system 108. The computing device 1702 is, for example, a server of a service provider, a device associated with a client (e.g., a client device), an on-chip system, and/or any other suitable computing device or computing system.

The example computing device 1702 as illustrated includes a processing system 1704, one or more computer-readable media 1706, and one or more I/O interface 1708 that are communicatively coupled, one to another. Although not shown, in one or more implementations the computing device 1702 further includes a system bus or other data and command transfer system that couples the various components, one to another. A system bus includes any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1704 is representative of functionality to perform one or more operations using hardware. Accordingly, the processing system 1704 is illustrated as including hardware element 1710 that are configured, for example, as processors, functional blocks, and so forth. The processing system 1704 is optionally implemented in hardware as an application specific integrated circuit or other logic device formed using one or more semiconductors. The hardware elements 1710 are not limited by the materials from which they are formed, or the processing mechanisms employed therein. For example, in one or more implementations processors are comprised of semiconductor(s) and/or transistors (e.g., electronic integrated circuits (ICs)). In such a context, processor-executable instructions include electronically-executable instructions.

The computer-readable storage media 1706 is illustrated as including memory/storage 1712. The memory/storage 1712 represents memory/storage capacity associated with one or more computer-readable media. The memory/storage component 1712 represents memory/storage capacity associated with one or more computer-readable media. The memory/storage component 512 includes one or both of volatile media (such as random access memory (RAM)) and nonvolatile media (such as read only memory (ROM), Flash memory, optical disks, magnetic disks, and so forth). The memory/storage component 1712 includes one or both of fixed media (e.g., RAM, ROM, a fixed hard drive, and so on) and removable media (e.g., Flash memory, a removable hard drive, an optical disc, and so forth). The computer-readable media 1706 is optionally configured in a variety of other ways as further described below.

Input/output interface(s) 1708 are representative of functionality to allow a user to enter commands and information to computing device 1702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which employs visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1702 is configured in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are implementable on a variety of commercial computing platforms having a variety of processors.

An implementation of the described modules and techniques is optionally stored on or transmitted across some form of computer-readable media. The computer-readable media includes any of a variety of media that is accessible by the computing device 1702. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Computer-readable storage media is non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which is accessed by a computer.

"Computer-readable signal media" refers to a signal-bearing medium that is configured to transmit instructions to the hardware of the computing device 1702, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1710 and computer-readable media 1706 are representative of modules, programmable device logic and/or fixed device logic implemented in a hardware form that are employed in some implementations to implement at least some aspects of the techniques described herein, such as to perform one or more instructions. Hardware includes, for example, components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are optionally employed to implement various techniques described herein. Accordingly, in one or more implementations software, hardware, or executable modules are implemented as one or more instructions and/or logic embodied on some form of computer-readable storage media and/or by one or more hardware elements 1710. The computing device 1702 is configured to implement particular instructions and/or functions corresponding to the software and/or hardware modules. Accordingly, implementation of a module that is executable by the computing device 1702 as software is achievable at least partially in hardware, e.g., through use of computer-readable storage media and/or hardware elements 1710 of the processing system 1704. The instructions and/or functions executable/operable by one or more articles of manufacture (for example, one or more computing devices 1702 and/or processing systems 1704) to implement techniques, modules, and examples described herein.

The techniques described herein are supported by various configurations of the computing device 1702 and are not limited to the specific examples of the techniques described herein. Additionally or alternatively, this functionality is implemented all or in part through use of a distributed system, such as over a "cloud" 1714 via a platform 1716 as described below.

The cloud 1714 includes and/or is representative of a platform 1716 for resources 1718. The platform 1716 abstracts underlying functionality of hardware (e.g., servers) and software resources of the cloud 1714. The resources 1718 include applications and/or data utilizable while computer processing is executed on servers that are remote from the computing device 1702. Resources 1718 optionally include services provided over the Internet and/or through a subscriber network, such as a cellular or Wi-Fi network.

The platform 1716 abstract resources and functions to connect the computing device 1702 with other computing devices. The platform 1716 also optionally serves to abstract scaling of resources to provide a corresponding level of scale to encountered demand for the resources 1718 that are implemented via the platform 1716. Accordingly, in an interconnected device embodiment, implementation of functionality described herein is distributed throughout the system 1700. For example, the functionality is implemented in part on the computing device 1702 as well as via the platform 1716 that abstracts the functionality of the cloud 1714.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method in a digital medium environment, the method comprising:
   receiving a 2D image having a texture;
   receiving user input indicating a positioning of the 2D image on a 2D canvas or on a 3D object on the 2D canvas, the user input having two dimensions of control;
   mapping the texture to a 2D lighting gel layer of a multi-layer light source, the 2D lighting gel layer being situated between an emissive layer of the multi-layer light source and the 2D canvas, the emissive layer emitting light rays that pass through the 2D lighting gel layer and project onto the 2D canvas or the 3D object;
   determining, as the emission of the multi-layer light source and based on the emissive layer and the 2D lighting gel layer, an emission from the 2D lighting gel layer; and
   changing colors of locations on the 2D canvas or the 3D object based on the emission of the multi-layer light source and the colors of locations of the 2D lighting gel layer that the light rays pass through in illuminating the 2D canvas or the 3D object.

2. The method as recited in claim 1, further comprising:
   identifying, based on a location of the multi-layer light source and a location of the 3D object, a shadow area identifying locations on the 3D image object or the 2D canvas where shadows are cast by the 3D object; and
   the changing colors including not changing the colors of the shadow area.

3. The method as recited in claim 1, further comprising:
   receiving user input identifying an area on the 2D canvas;
   determining, based on the user input identifying the area on the 2D canvas, an area for the emissive layer; and
   setting the emissive layer to be the determined area.

4. The method as recited in claim 1, further comprising:
   varying an irradiance of the emissive layer in response to a change in a shadow length based on the multi-layer light source, a change in locality of the multi-layer light source, or a change in a user specified emissive layer area.

5. The method as recited in claim 1, the 2D lighting gel layer and the emissive layer both being parallel to the 2D canvas.

6. The method as recited in claim 1, the multi-layer light source further including an additional 2D lighting gel layer situated between the emissive layer and the 2D lighting gel layer.

7. The method as recited in claim 1, further comprising:
   displaying a user interface including a control receiving user input changing an intensity of the emissive layer; and
   changing the intensity of the emissive layer in accordance with the user input changing the intensity.

8. The method as recited in claim 1, further comprising:
   displaying a user interface including a control receiving user input changing a distance of the 2D lighting gel layer from the 3D object or the 2D canvas; and
   changing the distance of the 2D lighting gel layer from the 3D object or the 2D canvas in accordance with the user input changing the distance.

9. The method as recited in claim 1, further comprising:
   displaying a user interface including a first control receiving user input changing a position of the 2D lighting gel layer in the x dimension of an x-y plane, and a second control receiving user input changing a position of the 2D lighting gel layer in the y dimension of the x-y plane; and
   changing the position of the 2D lighting gel layer in accordance with the user input changing the position of the 2D lighting gel layer.

10. A system comprising:
    a user input module, implemented at least in part in hardware, to receive a 2D image having a texture and to receive a user input indicating a positioning of the 2D image on a 2D canvas or on a 3D object on the 2D canvas, the user input having two dimensions of control;
    a light source configuration module, implemented at least in part in hardware, to map the texture to a 2D lighting gel layer of a multi-layer light source, the 2D lighting gel layer being situated between an emissive layer of the multi-layer light source and the 2D canvas, the emissive layer configured to emit light rays that pass through the 2D lighting gel layer and project onto the 2D canvas or the 3D object;
    a ray emission determination module, implemented at least in part in hardware, to determine, as the emission of the multi-layer light source and based on the emissive layer and the 2D lighting gel layer, an emission from the 2D lighting gel layer; and
    an image generation system, implemented at least in part in hardware, to change colors of locations on the 2D canvas or the 3D object based on the emission of the multi-layer light source and the colors of locations of the 2D lighting gel layer that the light rays pass through in illuminating the 2D canvas or the 3D object.

11. The system as recited in claim 10, further comprising a shadow generation module to identify, based on a location of the multi-layer light source and a location of the 3D object, a shadow area identifying locations on the 3D object or the 2D canvas where shadows are cast by the 3D object, and wherein the image generation system is further to not change the colors of the shadow area.

12. The system as recited in claim 10, further comprising an anisotropic blur module to receive user input identifying an area on the 2D canvas, determine, based on the user input identifying the area on the 2D canvas, an area for the emissive layer, and wherein the light source configuration module is to set the emissive layer to be the determined area.

13. The system as recited in claim 10, further comprising an emission scaling module to, with the light source configuration module, vary an irradiance of the emissive layer in response to a change in a shadow length based on the multi-layer light source, a change in locality of the multi-layer light source, or a change in a user specified emissive layer area.

14. The system as recited in claim 10, the 2D lighting gel layer and the emissive layer both being parallel to the 2D canvas.

15. The system as recited in claim 10, the multi-layer light source further including an additional 2D lighting gel layer situated between the emissive layer and the 2D lighting gel layer.

16. The system as recited in claim 10, wherein the user input module is further to display a user interface including a control receiving user input changing an intensity of the emissive layer, and wherein the light source configuration module is further to change the intensity of the emissive layer in accordance with the user input changing the intensity.

17. The system as recited in claim 10, wherein the user input module is further to display a user interface including a control receiving user input changing a distance of the 2D lighting gel layer from the 3D object or the 2D canvas, and wherein the light source configuration module is further to change the distance of the 2D lighting gel layer from the 3D object or the 2D canvas in accordance with the user input changing the distance.

18. The system as recited in claim 10, wherein the user input module is further to display a user interface including a first control receiving user input changing a position of the 2D lighting gel layer in the x dimension of an x-y plane, and a second control receiving user input changing a position of the 2D lighting gel layer in the y dimension of the x-y plane, and wherein the light source configuration module is further to change the position of the 2D lighting gel layer in accordance with the user input changing the position of the 2D lighting gel layer.

19. A system comprising:
a user input module, implemented at least in part in hardware, to receive a 2D image having a texture and to receive a user input indicating a positioning of the 2D image on a 2D canvas or on a 3D object on the 2D canvas, the user input having two dimensions of control;
means for, implemented at least in part in hardware, determining an emission from a 2D lighting gel layer of a multi-layer light source, the multi-layer light source including an emissive layer and the 2D lighting gel layer situated between the emissive layer and the 2D canvas, the emissive layer emitting light rays that pass through the 2D lighting gel layer and project onto the 2D canvas or the 3D object; and
an image generation system, implemented at least in part in hardware, to change colors of locations on the 2D canvas or the 3D object based on the emission of the multi-layer light source and the colors of locations of the 2D lighting gel layer that the light rays pass through in illuminating the 2D canvas or the 3D object.

20. The system as recited in claim 19, further comprising means for, implemented at least in part in hardware, varying an irradiance of the emissive layer in response to a change in a shadow length based on the multi-layer light source, a change in locality of the multi-layer light source, or a change in a user specified emissive layer area.

\* \* \* \* \*

UNITED STATES PATENT AND TRADEMARK OFFICE
CERTIFICATE OF CORRECTION

PATENT NO. : 11,321,889 B1
APPLICATION NO. : 17/082378
DATED : May 3, 2022
INVENTOR(S) : Sun et al.

It is certified that error appears in the above-identified patent and that said Letters Patent is hereby corrected as shown below:

In the Claims

Column 21, Line 53, after "on the 3D", delete "image".

Signed and Sealed this
Nineteenth Day of July, 2022

Katherine Kelly Vidal
*Director of the United States Patent and Trademark Office*